704/9, 10
See application file for complete search history.

(12) United States Patent
Hahn

(10) Patent No.: US 10,482,177 B2
(45) Date of Patent: Nov. 19, 2019

(54) DEEP READING MACHINE AND METHOD

(71) Applicant: Bruce C. Hahn, Smithville, TX (US)

(72) Inventor: Bruce C. Hahn, Smithville, TX (US)

( * ) Notice: Subject to any disclaimer, the term of this patent is extended or adjusted under 35 U.S.C. 154(b) by 0 days.

(21) Appl. No.: 15/662,073

(22) Filed: Jul. 27, 2017

(65) Prior Publication Data

US 2017/0351664 A1 Dec. 7, 2017

Related U.S. Application Data

(63) Continuation of application No. PCT/US2016/015099, filed on Jan. 27, 2016.
(60) Provisional application No. 62/108,954, filed on Jan. 28, 2015.

(51) Int. Cl.
| | |
|---|---|
| *G06F 17/21* | (2006.01) |
| *G06F 17/27* | (2006.01) |
| *G06T 13/20* | (2011.01) |
| *G06T 13/40* | (2011.01) |
| *G09B 17/00* | (2006.01) |

(52) U.S. Cl.
CPC ........ *G06F 17/2785* (2013.01); *G06F 17/214* (2013.01); *G06F 17/218* (2013.01); *G06F 17/271* (2013.01); *G06F 17/274* (2013.01); *G06F 17/277* (2013.01); *G06F 17/2775* (2013.01); *G09B 17/003* (2013.01)

(58) Field of Classification Search
CPC .... G06F 17/21; G06F 17/241; G06F 17/2258; G06F 17/2785; G06F 17/277; G06F 17/211; G06F 17/2705; G06K 9/00456; G10L 13/00

(56) References Cited

U.S. PATENT DOCUMENTS

| | | | | |
|---|---|---|---|---|
| 5,754,938 | A * | 5/1998 | Herz ................... | G06Q 20/383 348/E7.056 |
| 8,306,356 | B1 * | 11/2012 | Bever ................... | G06K 9/723 382/275 |
| 9,478,143 | B1 * | 10/2016 | Bowen .................. | G09B 5/06 |
| 2006/0197764 | A1 * | 9/2006 | Yang ...................... | G06T 13/80 345/473 |
| 2007/0168413 | A1 * | 7/2007 | Barletta .............. | G06F 3/04883 709/203 |
| 2007/0171226 | A1 * | 7/2007 | Gralley ................... | G06T 13/80 345/473 |
| 2008/0141126 | A1 * | 6/2008 | Johnson ................ | G06F 17/212 715/273 |
| 2008/0222252 | A1 * | 9/2008 | White ................. | H04L 12/1822 709/205 |
| 2008/0222552 | A1 * | 9/2008 | Batarseh ............... | G06F 3/0483 715/776 |
| 2010/0299149 | A1 * | 11/2010 | Kurzweil ................ | G10L 13/00 704/260 |

(Continued)

*Primary Examiner* — Olujimi A Adesanya
(74) *Attorney, Agent, or Firm* — DLA Piper LLP (US)

(57) ABSTRACT

A deep reading machine and method are disclosed in which a written language document may be transformed into a computer delivered kinetic framework of four dimensional rendered language. By removing the constraints of normal language reading, the machine and method create a watching, journey experience of gathering language in a multi-dimensional format. Using the machine and method, a reader comprehends language in an interactive, immersive and perceptually enjoyable reading experience.

40 Claims, 19 Drawing Sheets

Schematic View Layer Design within Playback Engine

(56) References Cited

U.S. PATENT DOCUMENTS

| | | | |
|---|---|---|---|
| 2012/0240036 A1* | 9/2012 | Howard | G06F 17/217 |
| | | | 715/251 |
| 2013/0145240 A1* | 6/2013 | Anderson | G06F 3/0483 |
| | | | 715/201 |
| 2013/0232407 A1* | 9/2013 | Onuma | G06F 17/30011 |
| | | | 715/251 |
| 2014/0082466 A1* | 3/2014 | Heo | G06F 17/24 |
| | | | 715/202 |
| 2016/0216858 A1* | 7/2016 | Khan | G06F 3/0483 |

* cited by examiner

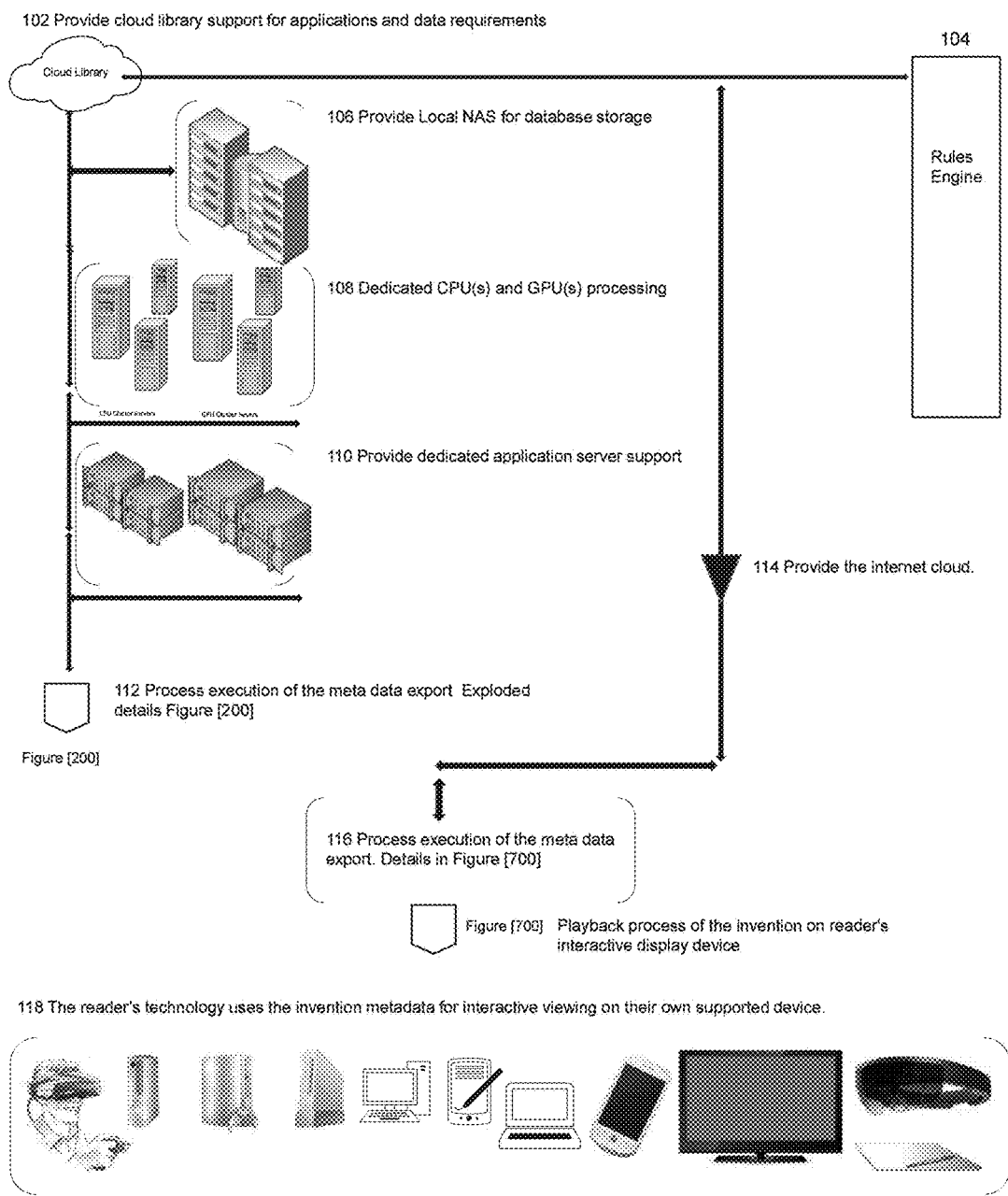
FIGURE: 100 - Block Diagram of the Integrated System

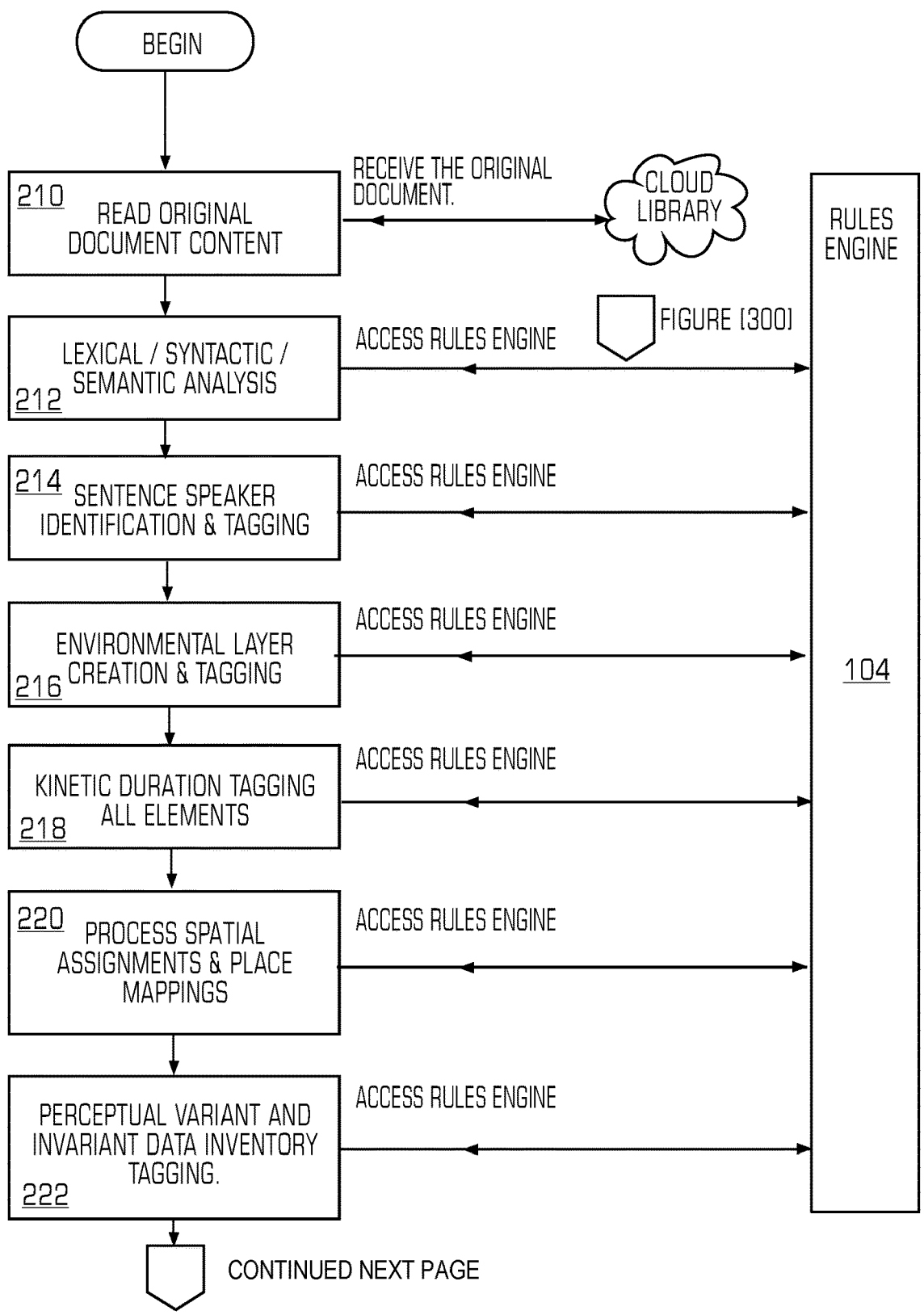
FIGURE: 200A - MANUFACTURING THE METADATA DIGITAL ASSET

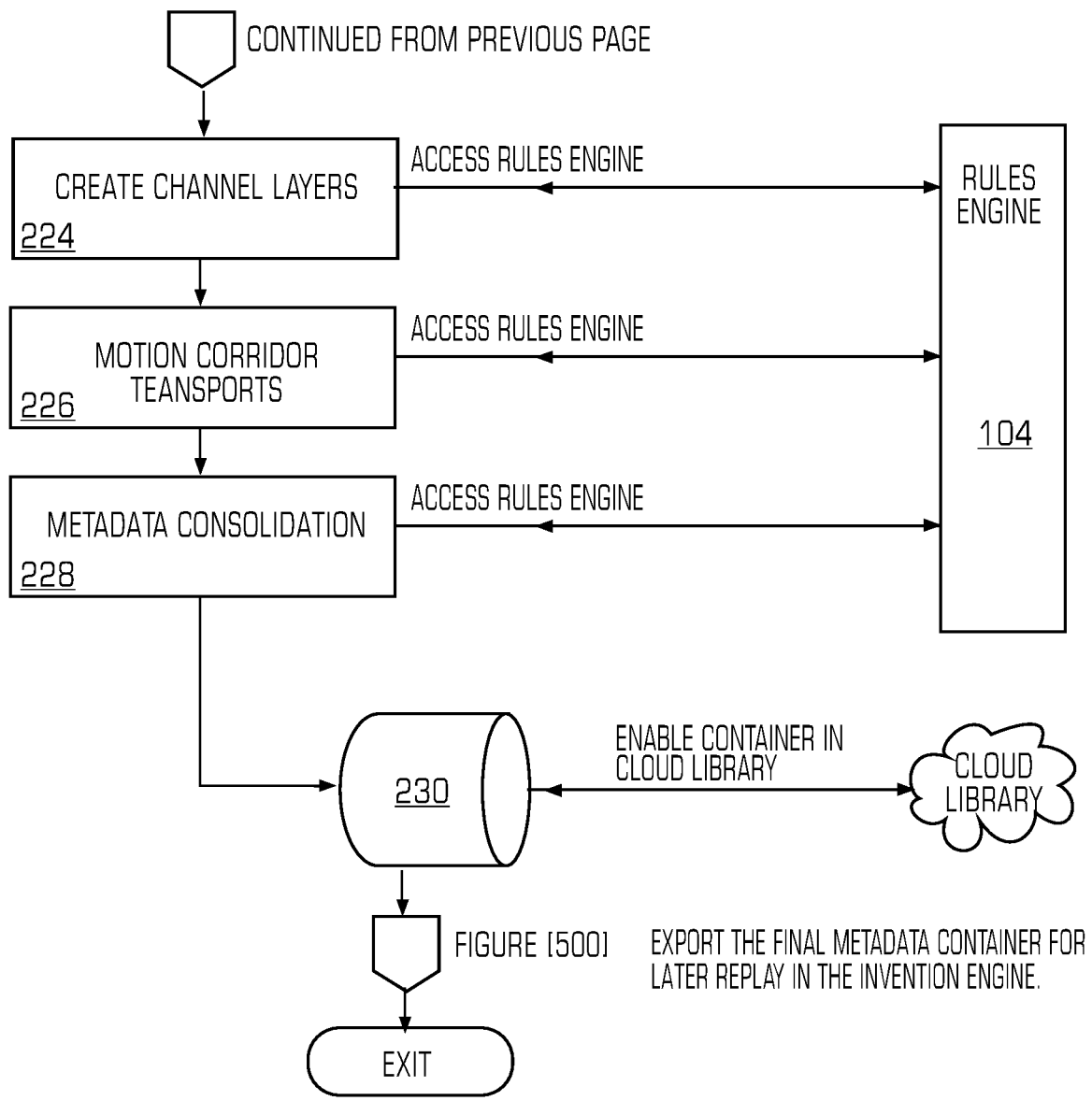
FIGURE: 200B - MANUFACTURING THE METADATA DIGITAL ASSET

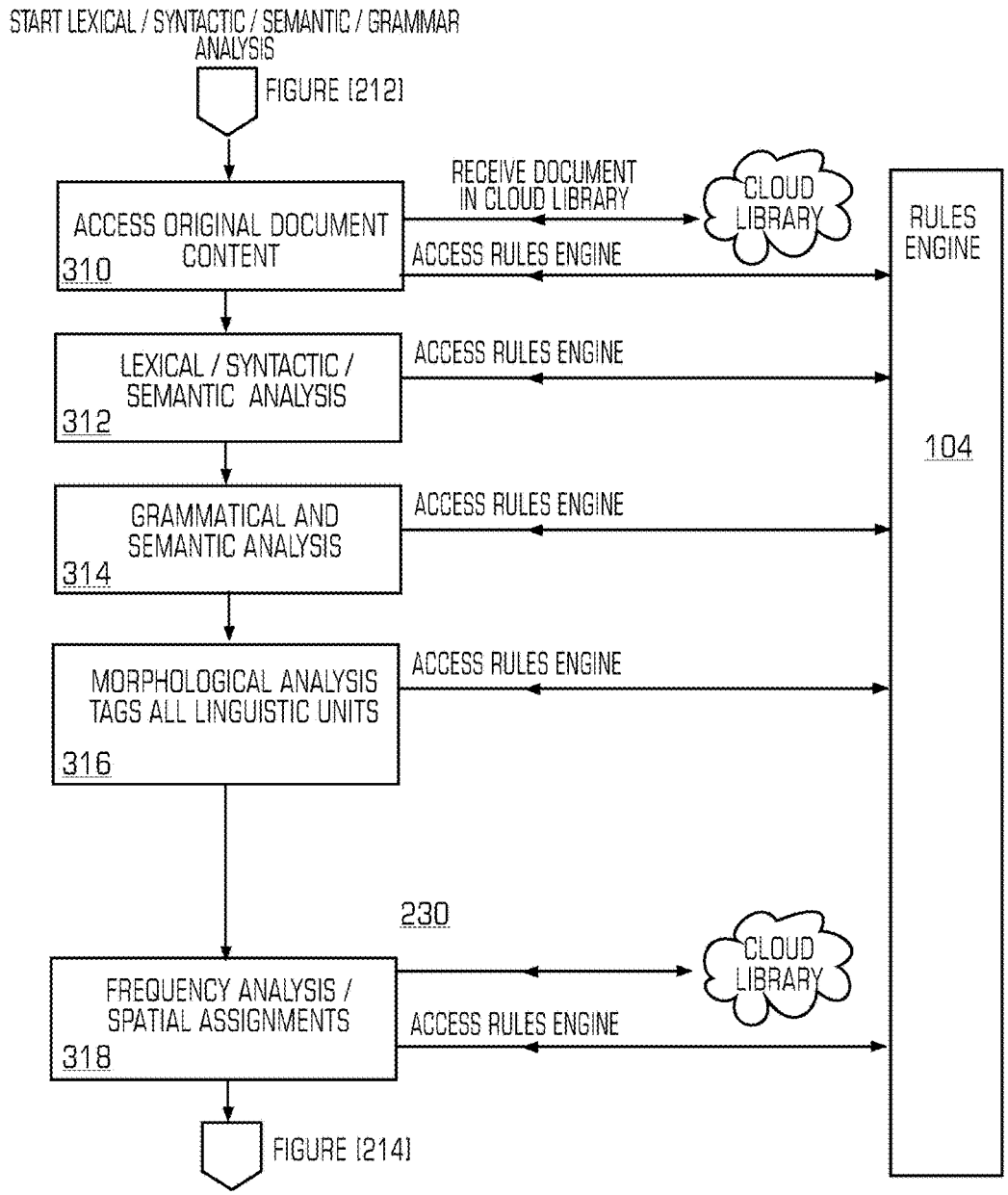
FIGURE: 300 - EXPLODED DETAILS LEXICAL/SYNTACTIC/SEMANTIC ANALYSIS [FROM 212]

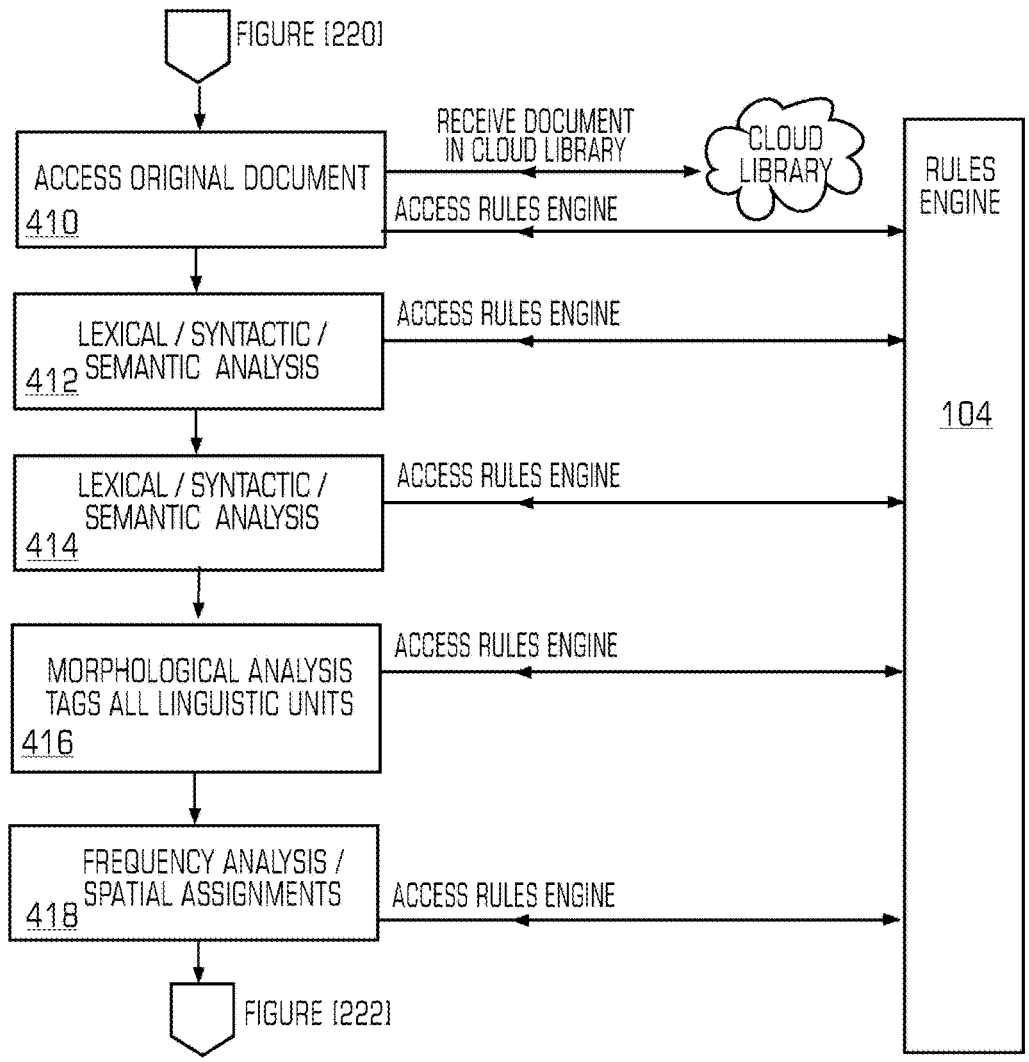
FIGURE: 400 - DETAILS SPATIAL ASSIGNMENTS PLACE MAPPINGS [FROM 220]

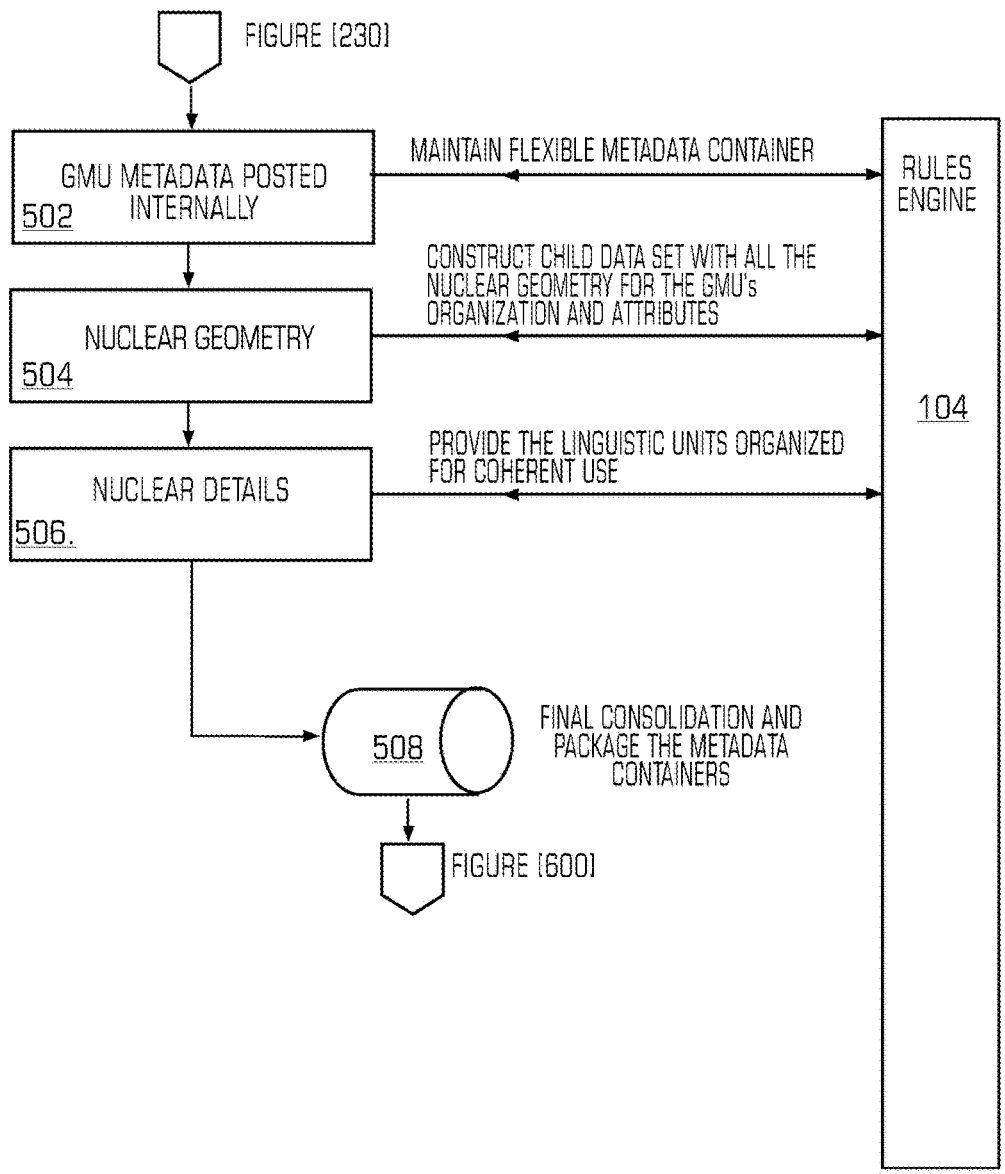
FIGURE: 500 - CONSTRUCT AND PACKAGE SECURELY THE METADATA CONTAINERS

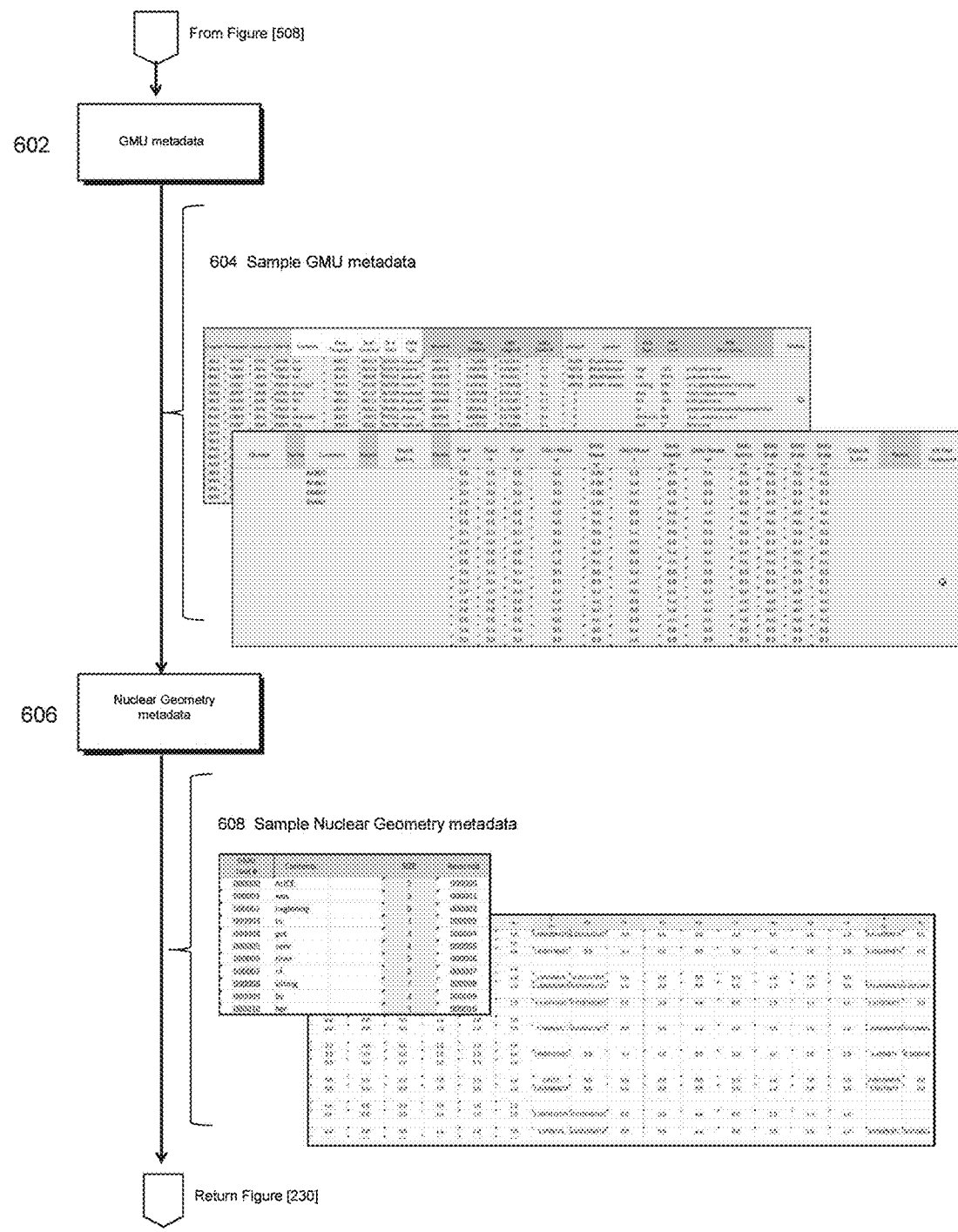
FIGURE 600 – Metadata Encapsulation

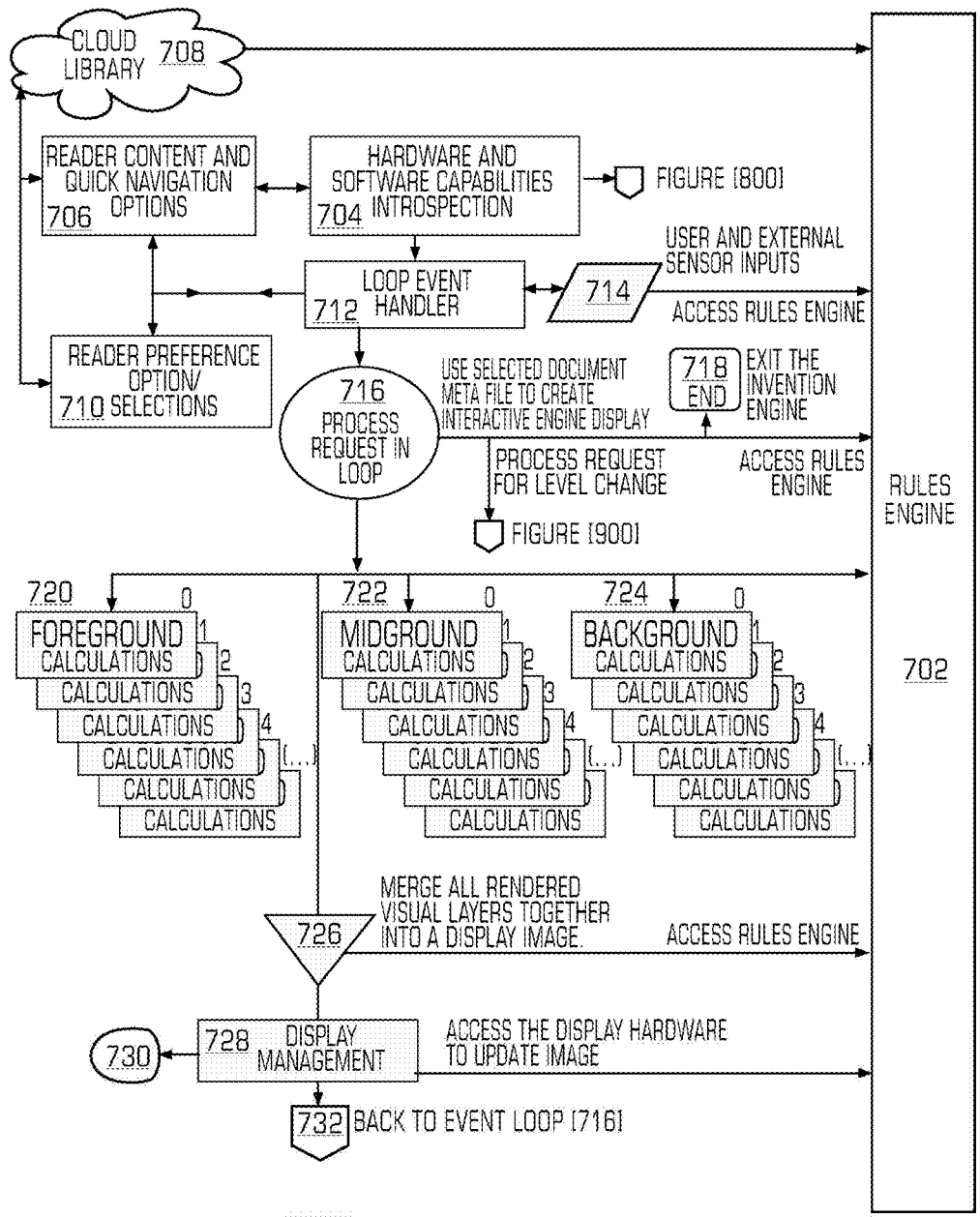
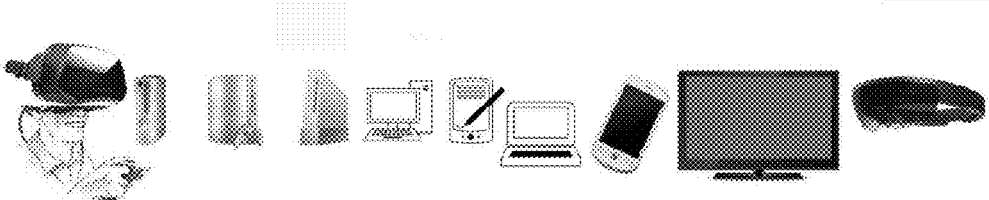
FIGURE: 700 - PLAYBACK PROCESS OF THE INVENTION ON READER'S INTERACTIVE DISPLAY DEVICE

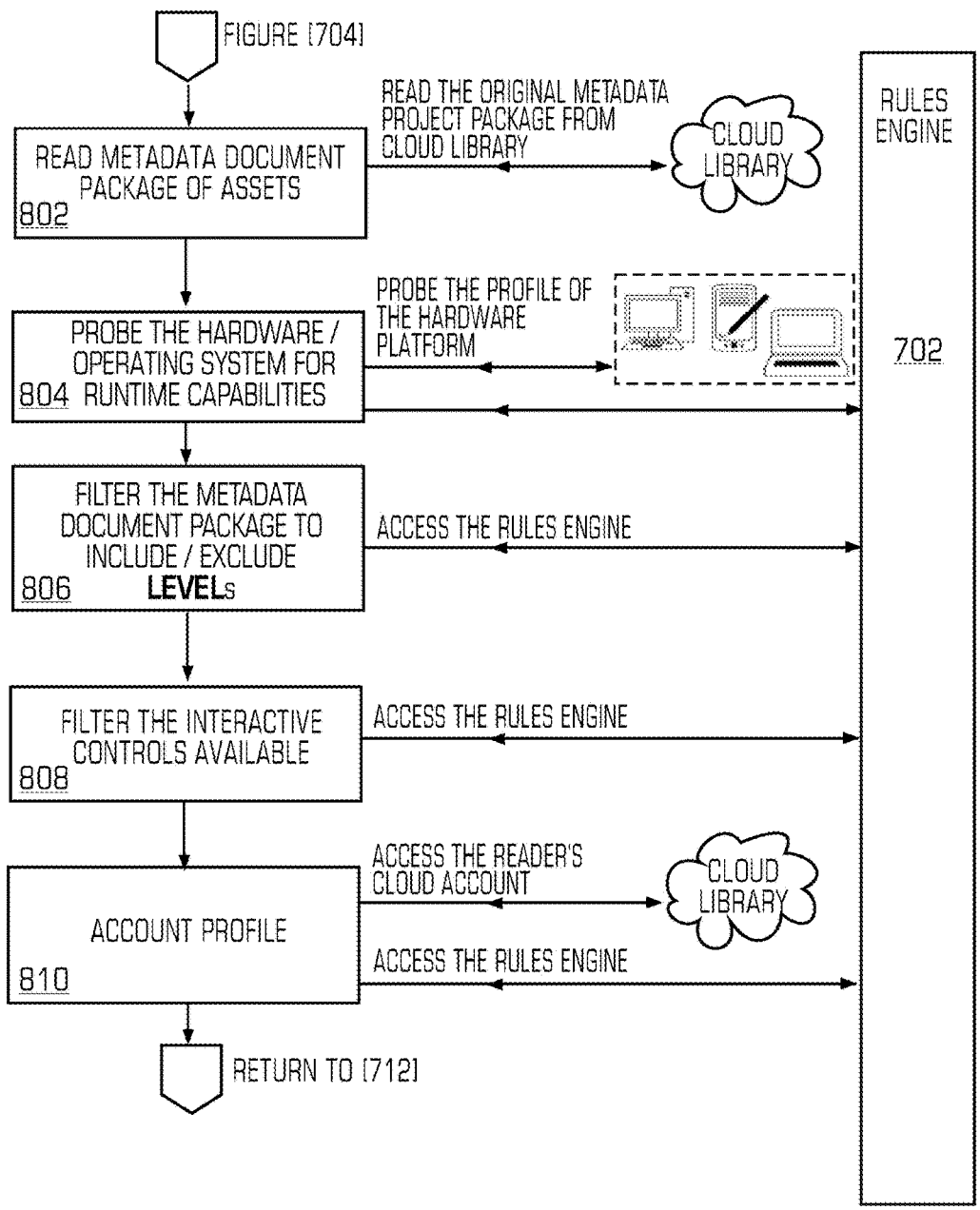
FIGURE: 800 - EXPLODED DETAILS OF OPEN METADATA DIGITAL PACKAGE

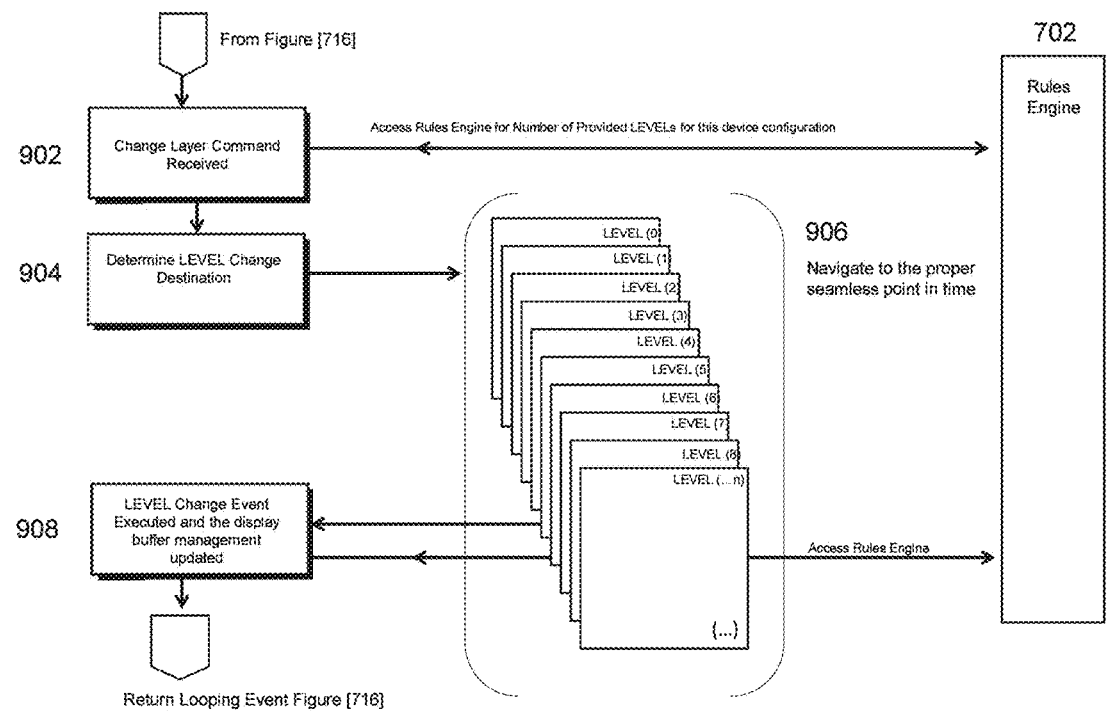
FIGURE 900 — Schematic View Layer Design within Playback Engine

FIG 1000: ALICE was beginning t[o]

FIG 1002: [A]LICE was beginning to get very

FIG 1004: was beginning to get very tired

FIG 1006: [in]g to get very tired of sitting by

FIG 1008: [v]ery tired of sitting by her sister

FIG 1010: [o]f sitting by her sister on the ba[nk]

FIG 1012: her sister on the bank, and of

FIG 1014: [b]ank, and of having nothing to d[o]

FIGURES 1000 - 1014 – Time ordered sequence illustration LEVEL 1 start of book

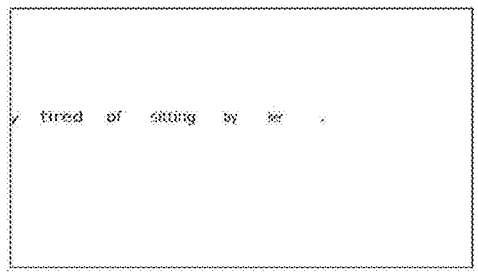
FIG 1100
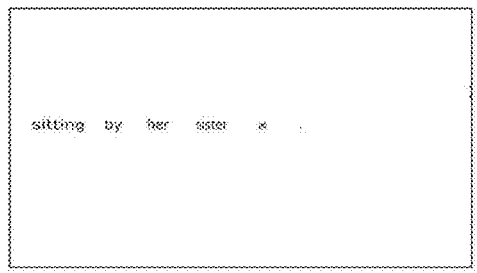
FIG 1102
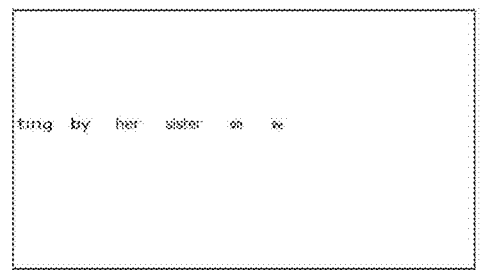
FIG 1104
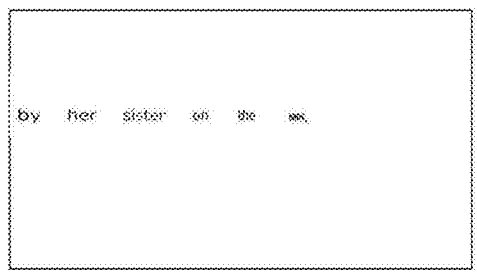
FIG 1106
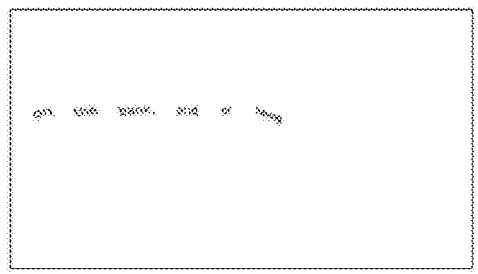
FIG 1108
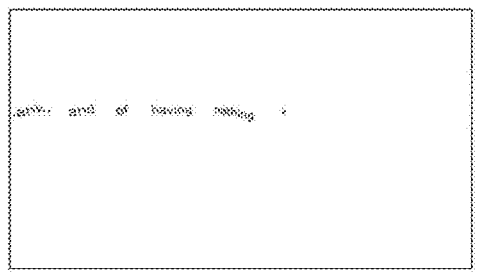
FIG 1110
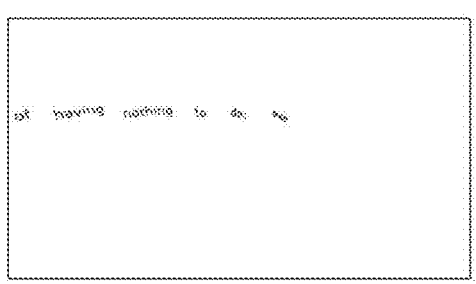
FIG 1112
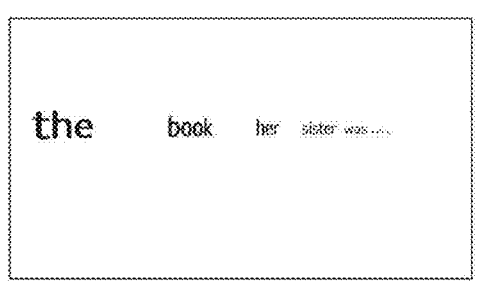
FIG 1114
FIGURES 1100 - 1114 -- Time Ordered Sequence Illustration of Camera Changing Vantage Point

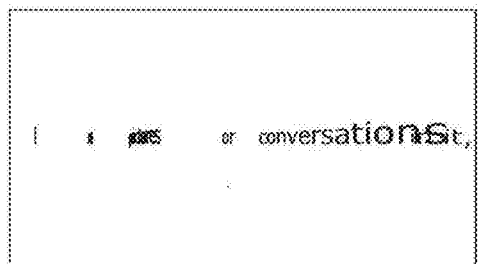
FIG 1200
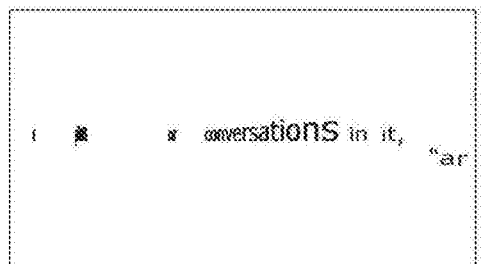
FIG 1202
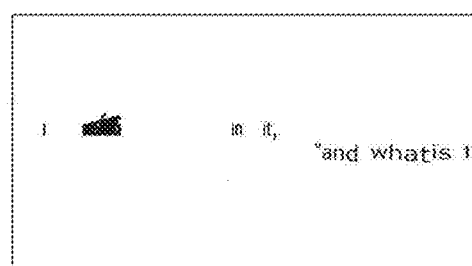
FIG 1204
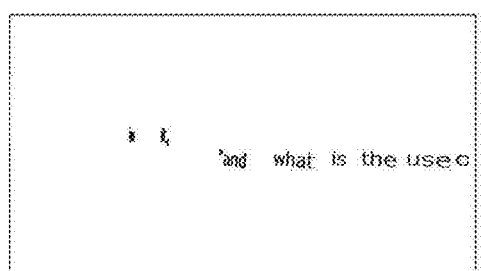
FIG 1206
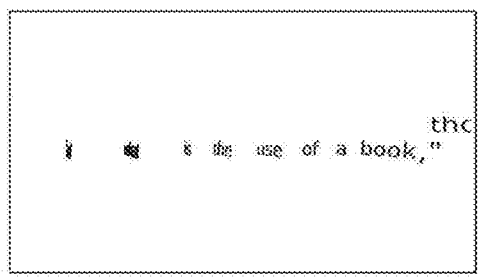
FIG 1208
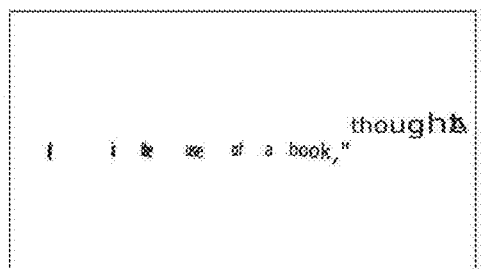
FIG 1210
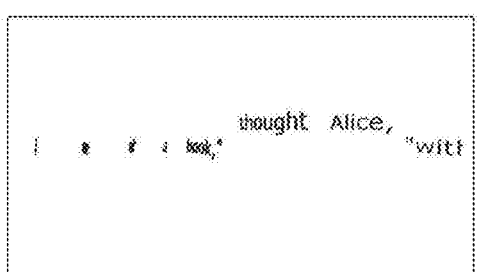
FIG 1212
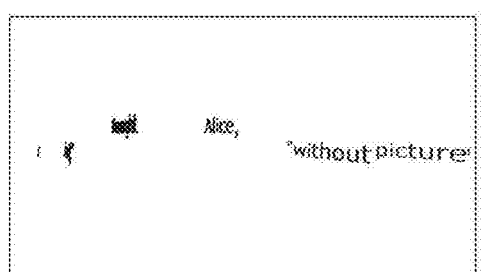
FIG 1214
FIGURES 1200 - 1214 — Time Ordered Sequence Illustration Dialog Spatial Attribute Design

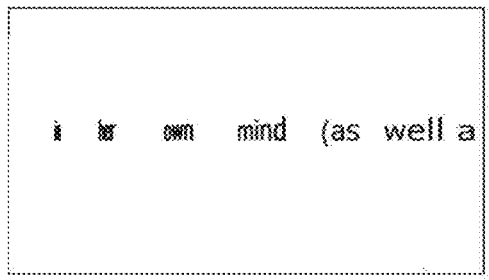
FIG 1300
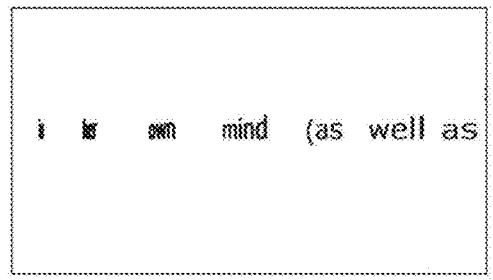
FIG 1302
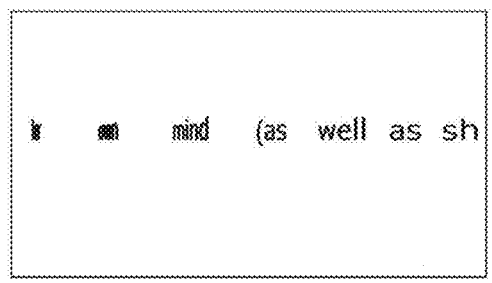
FIG 1304
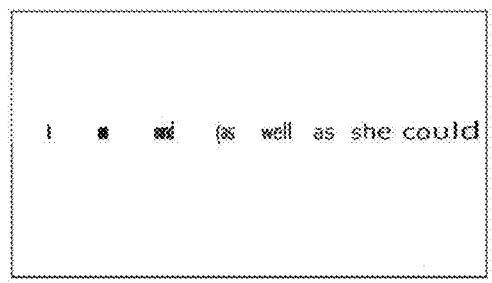
FIG 1306
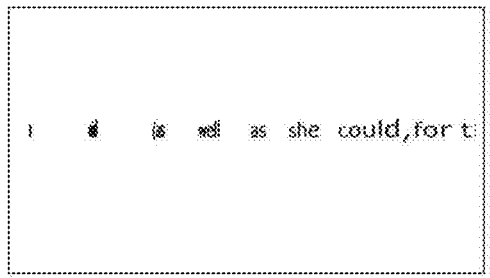
FIG 1308
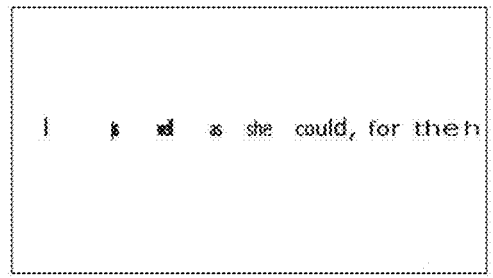
FIG 1310
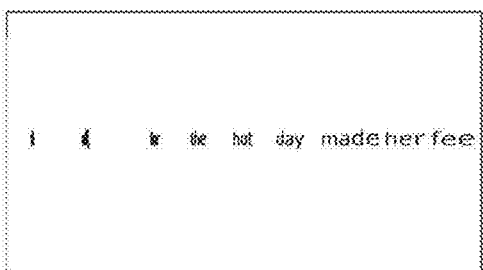
FIG 1312
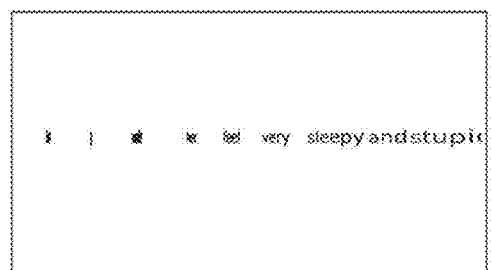
FIG 1314
FIGURES 1300 - 1314 — Time Ordered Sequence Illustration of Interactive Zoom FIGURES 1400 - 1414 — Time Ordered Sequence Illustration of Kinetic Properties Control placing GMUs
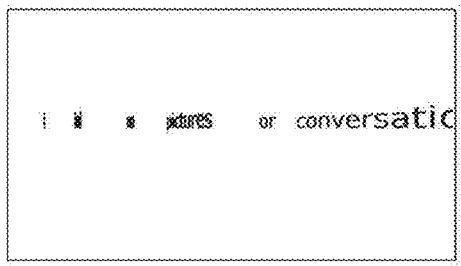
FIG 1400
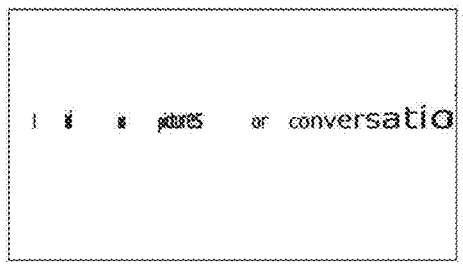
FIG 1402
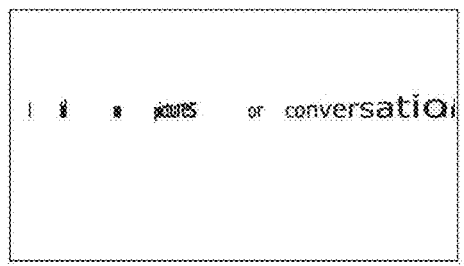
FIG 1404
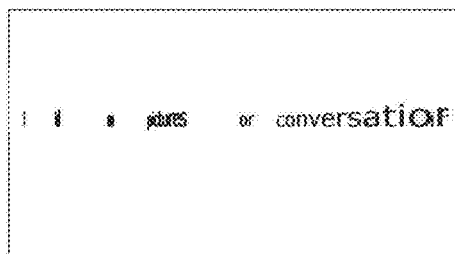
FIG 1406
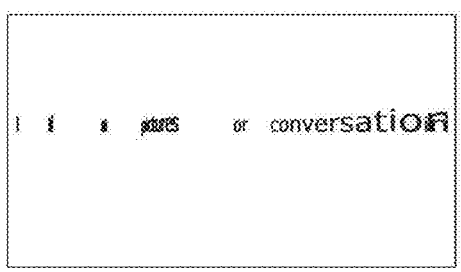
FIG 1408
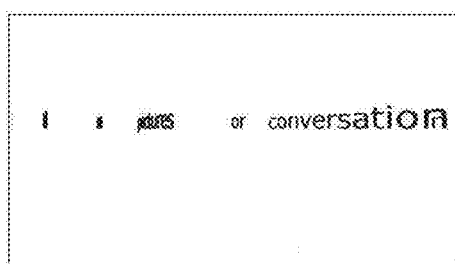
FIG 1410
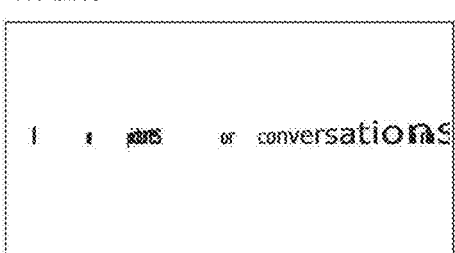
FIG 1412
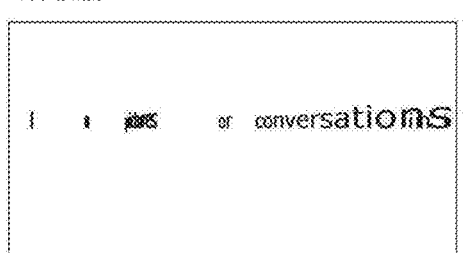
FIG 1414
FIGURES 1400 - 1414 — Time Ordered Sequence Illustration of Kinetic Properties Control placing GMUs

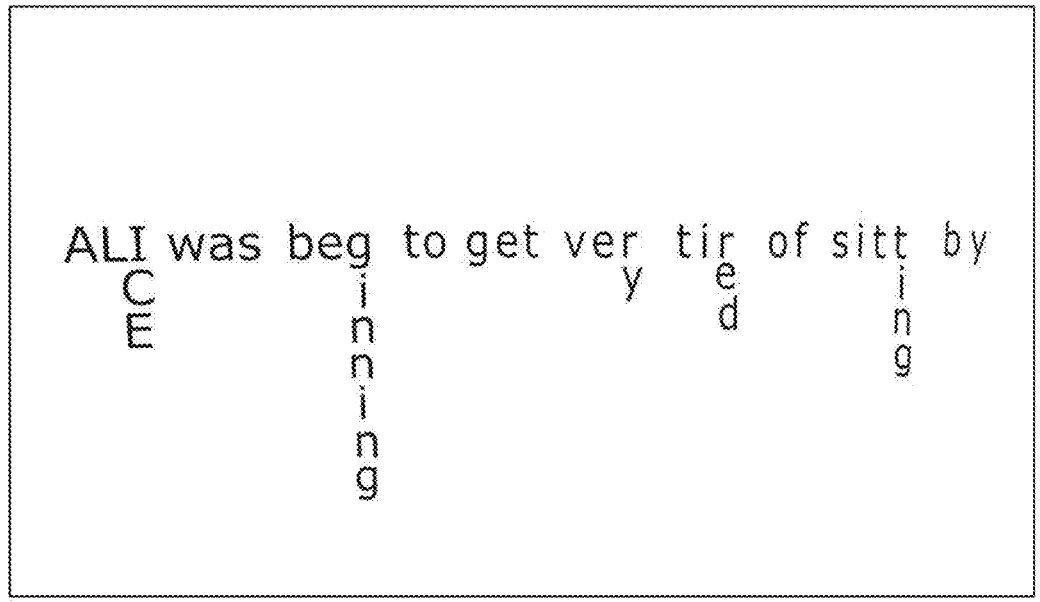
FIG 1500
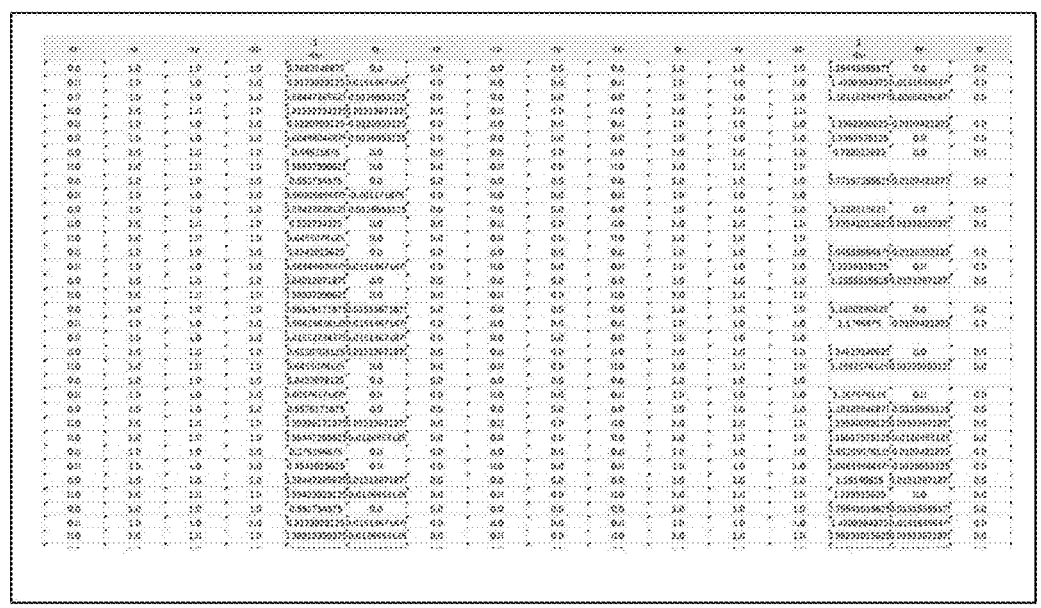
FIG 1502
FIGURES 1500 – 1502 – Illustration of Nuclear Geometry Powered Layout for Stacked Language

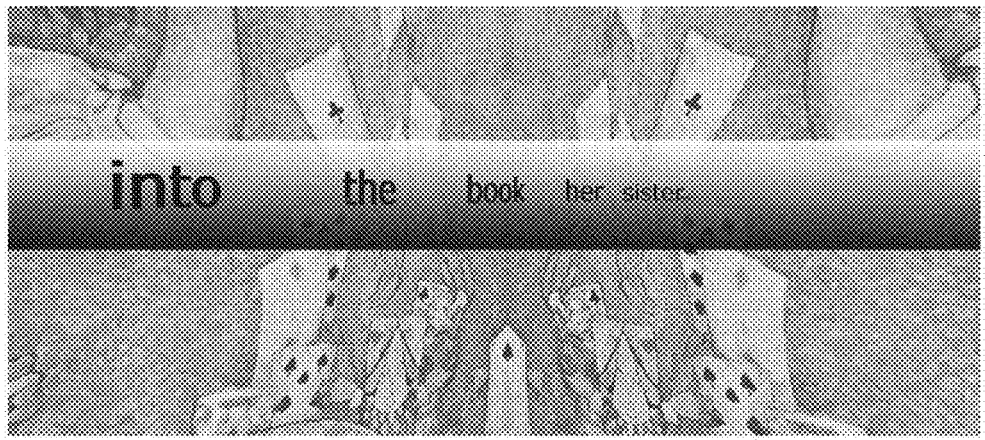
FIG 1600
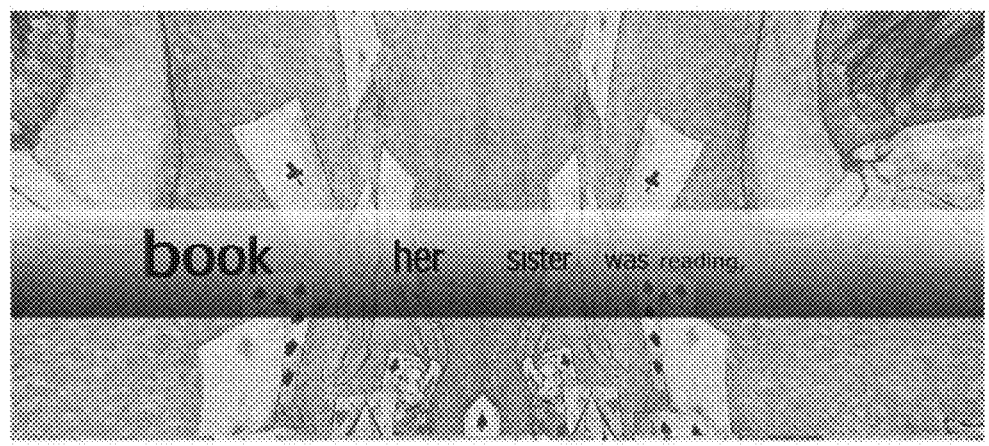
FIG 1602
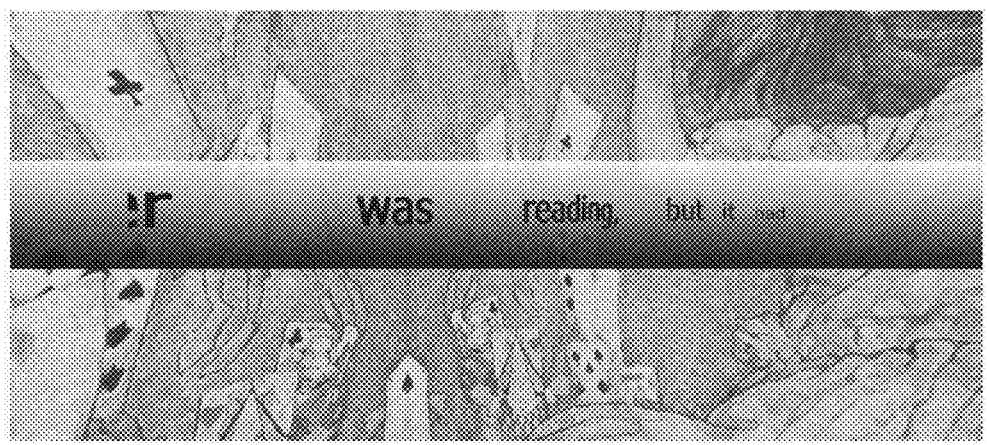
FIG 1604
FIGURES 1600 - 1604 – Atmospheric Layering

FIG 1700
FIG 1702
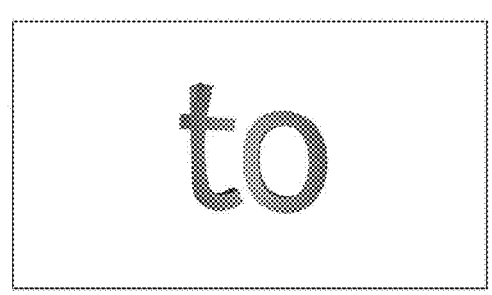
FIG 1704
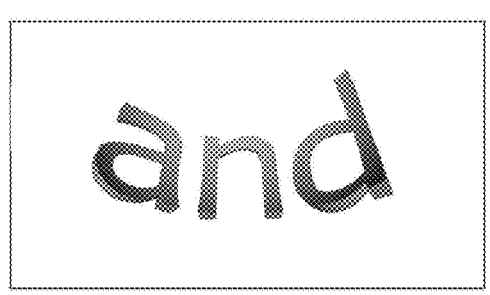
FIG 1706
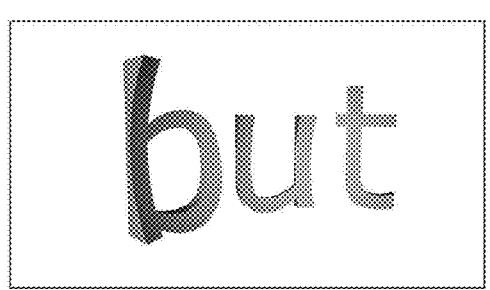
FIG 1708
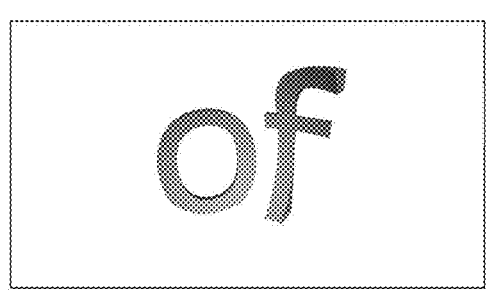
FIG 1710
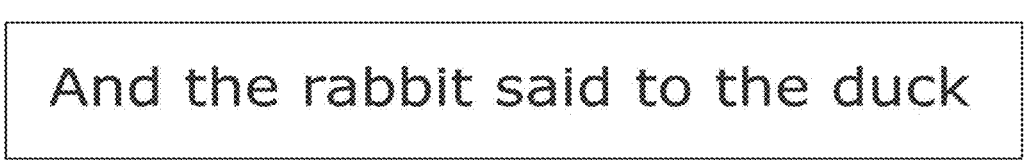
FIG 1712
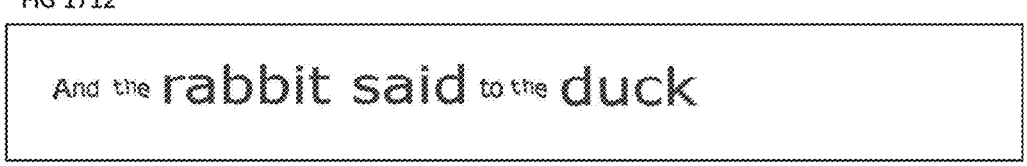
FIG 1714
FIGURES 1700 - 1714 – Representative Ligature Designs White Rabbit with pink eyes ran clc

FIG 1800 with pink eyes ran close by her.
                              The

FIG 1802 yes ran close by her.
        There was not

FIG 1804 an close by her.
    There was nothing

FIG 1806

White Rabbit with pink eyes ran close by her. There was nothing

FIG 1808 Original Sentence Fragment from *Alice in Wonderland*

A. ⟶
White Rabbit with pink eyes ran close by her. There was nothing
                    B. ⟶

FIG 1810

White Rabbit with pink eyes ran close by her.
                                    There was nothing

FIG 1812

FIGURES 1800 - 1812 -- Language Syntax Spatially Defined

DEEP READING MACHINE AND METHOD

PRIORITY CLAIM/RELATED APPLICATION

This application claims priority under 35 USC 120 and 35 USC 119 and is a continuation of PCT patent application PCT/US16/15099, filed Jan. 27, 2016 and entitled "DEEP READING MACHINE AND METHOD" that in turn claims the benefit under 35 USC 119(e) and priority under 35 USC 120 to U.S. Provisional Patent Application Ser. No. 62/108, 954 filed on Jan. 28, 2015 and entitled "Deep Reading Machine and Method", the entirety of all of which are incorporated herein by reference.

FIELD

Almost everyone reads. The disclosure relies on scientific research focused on the mental processes of the reading brain and the discovered neuroplasticity of these reconfigurable neuron pathways. Native perceptual workings inherent in the real time connection established between the eye and the brain organize the computational methods constructing the four dimensional framework used in the system. Within the system, these perceptual information gradients build the reader's four dimensional language transports manipulated by the system to playback the original word based document.

Linguistics and natural language analysis tools are used to process the syntactical, grammatical and semantic organization of any coherent written document. A rules engine and processing modules link computer graphic model making tools with semantic analysis to reconstruct sentences four dimensionally. These representations of language are structured in attribute driven digital models with kinetic properties assigned with runtime formulas for manipulation and placement. Building a perceptually enjoyable and exciting to watch reading experience the rendered language models must be carefully choreographed. The aesthetics of the immersive experience must be mesmerizing.

BACKGROUND

Reading is a learned behavior which begins at an early age. Reading is taught in schools as a social requirement for becoming educated and fully participating in our society. Reading is not a genetic trait. Reading is a learned activity typically requiring the coordinated use of a reader's eyes and a series of disparate cognitive activities. Through coordinated trial and error experiences a person learns to read the written word. In this learned behavior, a person develops a path of integrated brain functions cumulatively designated as the reading brain. Reading and these associated information gathering strategies for acquiring knowledge are generally divided into two types of reading. The solitary, contemplative and immersive experience of reading books and other documents is "deep reading".

The public's escalated use of Internet driven communications has been combined with a perusal model of reading words. This new interrupt driven and dominant method for acquiring language on the Internet is effectively re-training the neural processing of the reading brain to linguistically process language differently. This skimming model of reading is "shallow reading." Technology has made possible and effectively promotes this new type of shallow reading pattern.

Society's constant and growing use of the Internet to send and read our text language communications is combining with the neuroplasticity of the reading brain to effectively re-wire our neuron processing of words into a new perusal method for understanding written language. There are many negative implications for the wholesale adoption of this new reading/learning style of information gathering. In this new shallow pattern of gathering information the relationship between the brain's working memory and the permanent storage of long term memory is being detrimentally modified.

Prior efforts for publishing written language have been through developing document publishing languages like SGML (Standardized Graphic Markup Language). Two subsets of SGML are XML and HTML and these markup dialects have been used on the Internet to construct web pages for reading documents. SGML digital documents have been used by publishers to efficiently print traditional bound documents like books, magazines, scientific articles, etc. These efforts are largely focused on printing documents faster and cheaper.

Some publishers have manufactured computer screen devices built to be used with SGML pages to read without paper (eReaders). Delivering these documents digitally to these devices offers the reader a wider choice of aesthetic font and point size improvements while also controlling screen contrast, background and foreground color choices, and other limited display options. These electronic ink solutions and digital book readers have made acquiring and displaying traditional page oriented book design more convenient for the reader. These eBook readers have been virtualized into software and offer a reading solution on phones, tablets, and personal computers.

One advantage over print based books offered in the eReader solution is the use of a cloud based Internet solution. These connected devices store the reader's activities in the "cloud" and makes it possible to coordinate multiple connected reading devices. Start a book on your personal computer at work and continue reading later at the doctor's office on your phone while waiting for your appointment. The current page in the reading experience is shared from the personal computer to the phone and conveniently the reader's place in reading the book is maintained on multiple devices.

However, these electronic reading software solutions (eReaders) have continued the place based architecture of the displayed page. The same perceptual constraints on language and sentence structure are maintained in these solutions. The original mechanical constraints originating in the printing press are re-created digitally in these formatted pages. The cognitive reading brain activities of using a software reader application remain remarkable unchanged from reading a printed document. The person reading the digital book has the same perceptual experience and must labor with the same methods of saccadic eye movements to identify and decipher the words.

A separate software reading technology solution offered by several software providers is based upon a 1950's development strategy of Tachistoscope Reading Devices. This method, called rapid serial visual presentation (RSVP) depends on a word being placed on a display screen momentarily before the next word is presented, and so forth. In this method the reading brain is presented one word after the other without the need to move the eyes and find the next word in the sentence. The RSVP technology is intended to boost word per minute reading skills by reducing the labor associated with finding words in a sentence. RSVP does not address the root perceptual enjoyment issue of reading. Word presentation remains place based.

The real challenge in discovering a solution to the decline of immersive deep reading is finding a perceptual experience on par with other competing visual technologies. Media competition is fierce to gain access to a slice of a person's time and deep reading is losing the battle. The continued decline of deep reading in America continues at an alarming rate. Negative economic and intellectual repercussions accrue to an American that no longer deep reads.

The current placement rules for written language and the mechanically constrained patterns of reading used today are hundreds of years old. Today's current presentation of written language is place based and operates under a careful set of placement formatting rules. Text is typeset into words. Words are arranged into sentences. Sentences are horizontally placed in lines which flow over to following lines once the maximum line length has been reached. Rules exist for breaking up words and sentences if the word or sentence is longer than fits a normal horizontal line.

Reading starts with the eyes labor intensively scanning letters, forming words, evaluating and comprehending words. Ultimately the reader processes a completed sentence for meaning. All the perceptual relationships in this Cartesian system of written language are place based: one letter follows the next letter, et cetera. Each new line of text serially begins where the previous line left off. All the letters strung together, separated by word separators and knit together with semantic rules and punctuation marks constitute the original text information. These rules used for printing and/or displaying written language are place based and organized for the reader's eyes to search out and individually discover the meaning conveyed by the language.

Currently this perceptual system organizing written language is two dimensional and driven by the reader's eye movements. The duration of any word depends upon how quickly the eye can see the word, comprehend the word, and understand the word in the context of the larger sentence while moving on to the next word. In the current written language system of reading it is up to the reader's eyes to process the written language on its own perceptual terms. In this mechanically constrained system of language presentation all words are created equal. There are only minor visual area size differences between all the three letter words found in a book. For example, the words "god", "dog", "red", and "but" are all traditionally treated with the same display rules regardless of their syntactic value and or their differences semantically. In a place based system all written words are printed the same.

BRIEF DESCRIPTION OF THE DRAWINGS

A better understanding of the present invention can be obtained when the detailed description of the preferred embodiment is considered in conjunction with the following drawings, in which:

FIG. 100 is a block diagram of an implementation of an integrated deep reading system;

FIGS. 200A and 200B illustrate a method for manufacturing metadata digital assets that is part of a method for creating the metadata formatted data provided to the system in FIG. 100 for interactive playback;

FIG. 300 illustrates a method for lexical/Syntactic/Semantic Analysis that is part of a method for creating the metadata formatted data provided to the system in FIG. 100 for interactive playback;

FIG. 400 illustrates a method for adding the Details Spatial Assignments Place Mappings that is part of a method for creating the metadata formatted data provided to the system in FIG. 100 for interactive playback;

FIG. 500 illustrates a method to Construct and package securely the metadata containers that is part of a method for creating the metadata formatted data provided to the system in FIG. 100 for interactive playback;

FIG. 600 illustrates a method to encapsulate the Metadata that is part of a method for creating the metadata formatted data provided to the system in FIG. 100 for interactive playback;

FIG. 700 illustrates a playback process for an interactive display device of a reader that is part of a method for creating the metadata formatted data provided to the system in FIG. 100 for interactive playback;

FIG. 800 illustrates exploded details of Open Meta Data Digital Package that may be used by the system in FIG. 100;

FIG. 900 is a schematic illustration of playback level change capabilities using the playback engine of the system in FIG. 100;

FIGS. 1000-1014 are a time ordered filmstrip depiction of 4 dimensional language display for LEVEL 1 that may be part of the deep reading method provided by the system in FIG. 100;

FIGS. 1100-1114 illustrate an example of the LEVEL 1 embodiment of time ordered filmstrip depicting the use of interactive reader controls to choose camera viewpoints for best reading experience;

FIGS. 1200-1214 illustrate an example of a LEVEL "X" embodiment of time ordered filmstrip depicting adding spatial attributes of movement in dimensions X,Y,Z for dialog geometry construction;

FIGS. 1300-1314 illustrate an example of the LEVEL "X" embodiment of time ordered filmstrip depicting the reader's interactive controls to zoom in and/or out to change the size of letters in GMUs and the overall displayed information density provided on screen;

FIGS. 1400-1414 illustrate an example of a LEVEL "X" embodiment of time ordered filmstrip depicting runtime modification in language kinetic property assignment animating GMU's for presentation to the reader's eyes in the best possible perceptual framework;

FIGS. 1500-1502 illustrate an example of the direct relationship between the data provided in the nuclear geometry and the visual presentation of the language contained in the reading engine. Each graphic model unit ("word") is constructed at run time from the metadata;

FIGS. 1600-1604 illustrate an example of the LEVEL "X" embodiment of time ordered filmstrip depicting the use of three dimensional murals applied in the reading engine to the sky and ground plane containing the display of language;

FIGS. 1700-1714 illustrate examples of the LEVEL "X" embodiment substituting specialized ligatures into the reading engines presentation of language in which common conjunctives and determiners are built into geometrical objects;

FIGS. 1800-1812 illustrates the mechanics of using spatial transforms to aid the reader in understanding language syntax by adding attributes to mark important grammatical changes in the structured flow of written language.

DETAILED DESCRIPTION OF ONE OR MORE EMBODIMENTS

The disclosure is particularly applicable to a cloud based deep reading system and method as described below and it is in this context that the disclosure will be described. It will be appreciated, however, that the system and method has greater utility since it may, for example, be implemented using other known or yet to be developed computer architectures that would be within the scope of the disclosure.

The system and method construct a new framework of written language presentation controls built in a four dimensional perceptual space to effectively expand the available dynamic spectrum of kinetic attributes available to create the immersive watching model of deep reading documents. The system and method personalize the reader's language experience with interactive controls for traveling through a journey experience at multiple levels of language abstraction and words are no longer only place based.

Unlike the traditional space based reading, written language represented within the system and method may be multi-dimensional in the perceptual variables used to render the language to the reader's eye. The system and method choreographs and predicts saccadic movements within the sentence structure, modifies the flow and speed of the constituent letters, and responsively shapes the overall perceptual framework of the visual package delivered to the reader's eye and mind at both the word and sentence level.

The deep reading experience offered by the system and method is a watching experience organized as an enjoyable perceptual experience responsive to the user's interactive controls. The displayed flow of language is organized as a perceptual journey experience choreographed to define an immersive deep reading state of attention. By capitalizing on the seamless flow of language in a perceptually exciting framework the plasticity of the reading brain is marshaled to move language from working memory to long term memory. The system and method removes much of the eye labor associated with traditional reading and makes deep reading in an immersive environment flexible and enjoyable.

The perceptual framework used in the system and method creates a four dimensional model for representing written language. In this environmental space of the system and method, perceptual information gradients organize a four dimensional world of written language. Placement in space, kinetic properties, visual textures, all letter and word durations are dynamically linked variables in the newly ordered language system. By using linguistic analysis and processing of the original document the system and method models in four dimensions written language with a new set of visual controls. The system and method provides the improved capacity to tag these dimensional characteristics to the representation of written language. The end result for the user using the system is a richer and more engaged perceptual reading experience.

In this system and method, each word becomes a geometric and kinetically specified construction formula. Each sentence is a higher order superset of the constituent word formulas. Additionally each sentence is constructed geometrically and kinetically with its own set of formulas assigned to control time and spatial dimensions. All the physically perceived geometries of a word's representation, the choreographed constituent letters, the speed on screen, duration of a word on screen, the visual contrast of a words foreground and background renderings, the frequency data of a word within the context of the larger body of work, even the frequency data of a specified word within the larger lifespan experience of the reader using the system and method is calculated into the display formula.

The primary language presentation occurs in the foreground of a playback engine on each computing device of the system. A mid ground is calculated with information gradients to help the reader stay focused on the language presentation. The background perceptual spaces are calculated at the user preference level. These backdrops for the language presentation are dynamically assigned at run time in the journey experiences. This editorial level of visualization support can be tied to the content of the narrative story being told. For instance, descriptive passages at night in the woods can be environmentally and visually different than descriptions of literary characters entertaining at the beach. When required the ambiance and visual tracking of the story can be mirrored in the background backdrops appearing in the playback engine.

The characteristics of the playback are naturally conformed at runtime to the capabilities of a computing device that has combined display, sensory inputs and processing hardware capabilities. In the system, each computing device may be a processing unit based device with memory and connectivity circuits. For example, each computing device may be a personal computer, a smartphone device, a phone device, a virtual reality device, an augmented reality device, a game console, a terminal, a tablet computer or a laptop computer. Thus, a phone with limited display DPI and GPU rendering power is handled differently than a more comprehensive and dedicated virtual reality integrated system. If the hardware display is a virtual reality platform replete with perceptual computing capabilities then the perceptual framework created for the reader is further enhanced. The system and method manages multiple combinations of graphic and processing power combinations in the runtime engine. The best available perceptual experience is generated based upon the available hardware resources and the preferences of the reader.

The reader's user interface experience with the system and method is tuned interactively to the reader's attention level and their experience level in using the system and method. Multiple view corridors (levels) are available within the system and method to modify the rate of language flow and the degree of complexity and abstraction presented within a selected view corridor. There are no rigid presentation rules based on Cartesian place in the deep reading system and method. Thus, all words are not created equal. For example, the three letter words "god", "dog", "red", and "but" are all dynamically rendered and kinetically presented at play back time in the system and method. Each words semantic and syntactic place is evaluated and inserted in the metadata format to construct these multiple view corridors. Color, texture, visual orientation, duration, and visual rhythms are used to calculate and render the word within the sentence. The reader's preferences for environmental backgrounds, and abstraction levels are all factored into a final calculated perceptually enjoyable journey experience of reading the document. The speed of the entire journey experience is continuously variable and is controlled by the reader interactively.

A deep reader candidate today has many competing activities all vying for a slice of his personal time. Today a young person can watch high resolution television, go to the movies, play interactive highly choreographed games, surf the internet, or read a book. Except for reading a book, the common denominator amongst the other screen delivered activities is the highly produced visual, perceptual experience enticing the person to participate.

The Internet has become the most successful technology to gain a greater share of a person's available time. The combined media richness of Internet communications and the interactive social values discovered in personalizing an experience tailored to the individual have resulted in rapid usage growth. The perceptual gap existing between deep reading in its current form (books, magazines, essays, documents) and the other forms of modern communication has grown too large. The propensity and hereditary drive of individuals to stay away from the deep reading experience is addressed in the system and method by creating new rules for presenting written language.

The system and method replaces the traditional place based language with rigid rules for assignment on two dimensional page architectures with a journey based, watched representation of language specified at runtime by interactive controls responsive to the reader. Using both syntactic and semantic analysis a four dimensional virtual modeled environment is built for the reader. Word and sentence place and orientation is no longer determined by static fonts and rigid sentence constraints. The modeled language for the deep reading system and method is streamed in multiple simultaneous corridors appropriate to the preferences of the reader and their desired abstraction level.

The display environment for the system and method's deep reading experience is orchestrated visually to be on par with other high resolution media experiences. The system and method removes language representation from a page oriented, two dimensional frame work. The system and method transforms the language representation by using unconstrained language to create the immersive reading experience.

Maintaining a fluid immersive experience is managed by supporting a host of active and passive sensory perceptual inputs for interacting with the system and method. Supported inputs such as keyboards, mice, touch screens, passive and active stylus pens, three dimensional real time environmental sensors, game controllers, speech recognition, eye tracking, head tracking, heart rate monitoring, real time EEG monitoring are device dependent. Runtime decisions are made to configure the system and method for playback on a variety of computing devices. For example, if the reader's physical surroundings become dark, the system and method adjust the contrast ratio and the lighting ambience of the environmental layers to keep the language presentation easy to read.

The system and method also may allow for the use of three dimensional spatial data to be an input which can be used at runtime to create a geometric modification of the metadata which can make the reader's eyes happier with the results. For example, the method can shape the geometry of the presented language so the presentation of the language psychologically fits seamlessly into either an augmented reality or virtual reality presentation to the reader's eyes. When reading a written document, the geometric characteristics of the space shaped by the language presentation can conform to the real dimensions of the space the user finds themselves in. The method's ability to control the spatial shape of the geometry model used to build the reader's language presentation prevents awkward reading situations that can denigrate the reading experience by violating real world perceptions.

The benefit of the system and method is to change the visual perceptual experience of reading. The final net result of the system and method is a re-trained reading brain enjoying an immersive deep reading process. The system and method transforms reading written language into a visually exciting event removed from the original labor of traditional reading. The process deconstructs the traditional written language documents into a metadata data format which is structurally organized by the information gradients found in the visual world. This attribute rich metadata format is interactively navigated by the end user and the immersive qualities of the perceptually modified language route the end user into the immersive, deep reading experience.

The system and method may be implemented in software, hardware or a combination of hardware and software. When the system is implemented in hardware, each component of the system as described below may be implemented in a hardware device, such as a computing device, an application specific integrated circuit, a programmable logic device and the like in which the hardware devices operate to perform the functions of the system.

In a software implementation of the system, the system may be one or more computing resources that execute a plurality of lines of computer code and the execution of the plurality of lines of computer code perform the functions of the system. The computing resources may be a cloud computing resources including blade servers, processors, CPUs, GPUs, local storage systems and application servers. In the software implementation, the lines of computer code may be executed by a processor so that that processor is configured to perform the functions of the system. In the software implementation, the system and method may consist of two linked software processes.

The first stage in the computerized process is a process method that acquires a coherent written document. For example, input the public domain book for Lewis Carrol's Alice in Wonderland. The book's ordinal set of words are deconstructed into an intelligent linguistic set of data at the lexeme, morpheme and phoneme level. Using linguistic analysis and grammatical structure assignments, a master metadata digital format is constructed and maintained as a superset of attributes describing the form and function of the original text. With further processing the system and method's rules engine assigns the additional 4 dimensional attributes to the metadata description. Geometric model data is developed and associated with the original document word objects. Multiple corridor journey transports are created and written in the metadata as level assignments for interactive play back.

A second stage in the system and method is delivering the metadata package to a remote computerized device (phone, tablet, personal computer, virtual reality device, game console). Using the metadata package from the system configured for the device, the reader is transported into an immersive, perceptually exciting experience responding to the interactive controls (examples include: mouse, voice, tablet, touch, gesture recognition, brain wave monitoring, eye tracking, and other recognized user inputs), as the book is read. Examples of the immersive, perceptually exciting experience generated by the system are shown in FIGS. 1000-1812 and described below.

FIG. 100 illustrates one embodiment of a system operable to implement various embodiments of the current system. Note that various ones of the components/servers illustrated in FIG. 100 (or others) may be omitted or added as required. FIG. 100 is a block diagram of an implementation of an integrated deep reading system. The implementation of the system in FIG. 100 is a software implementation of the system that includes a backend system and one or more computer devices that couple and connect to the backend system over a communications link so that the user of each computing device may experience the deep reading experience provided by the system. In some embodiments, each computing device may have application executed by the processor of the computing device that allows the user to interact with the data provided by the system. The application may be a browser application, a mobile application downloaded to the computing device or an application embedded in the computing device.

The backend system may further include a cloud library 102, a rules engine 104, a storage component 106, a processing component 108 and one or more applications servers 110. The cloud library 102 may be a library of technology that provides on demand data and computational support for a) rules engine 104, b) manufacturing metadata requirements, and c) user device downloads, application security, support and logic. The rules engine 104 is provided to deliver the superset of common application classes, procedural requirements, decision making and databases for the entire system. The storage component 106 may be local network support includes network attached storage that provides storage for the system. More specifically, the storage component 106 may provide local NAS support for data access configurations accessed whenever and wherever required data interactions occur. The processing component 108 may include dedicated central processing units (CPU) that may be networked together to provide the computational resources and dedicated graphical processing units (GPU) that may be networked together to provide the matrix math capabilities required in the model making and language processing. The application servers 110 may be dedicated application servers that provide interaction functions with the computing devices as well as batch processing operations of the system.

The system may (112) make a targeted written document ready for delivery to the manufacturing process to create the metadata digital asset that may then be provided to each computing device. Further details of this process are shown in FIG. 200. The system may then provide internet cloud logistics (114) are provided for the connection of the reader customer to the cloud library for security, application, data delivery requirements and metadata requirement fulfillment. The system (116) may then deliver a targeted written document and the equivalent manufactured digital asset to one or more computing devices 118. Each computing device may be a processing unit based device with memory and connectivity circuits and may be various operating system (Windows, iOS, Android, etc.) device classes. For example, each computing device may be a personal computer, a smartphone device, a phone device, a virtual reality device, an augmented reality device, a game console, a terminal, a tablet computer, VR headsets, AR headsets or a laptop computer. Each computing device 118 may have image display capabilities in 2 dimensional and three dimensional configurations for planar and holographic displays.

FIG. 200 illustrates a method for manufacturing metadata digital assets that is part of a method for creating the metadata formatted data provided to the system in FIG. 100 for interactive playback on various computing devices. The process shown in FIG. 200 may be performed by the backend system shown in FIG. 100. In the process shown in FIG. 200, the system may retrieve an original written document in digital format from storage locally, remotely or over the Internet (210). The representation of the book or written document can be obtained in any format suitable for conversion to a machine readable document.

The document may be profiled by the rules engine 104 to be certain that the document meets minimum requirements for conversion. The method may then pass the document (212) to the 310 process for complete inspection. In more detail, during the process 212, the lexical, syntactic and grammatical analysis of the document data is processed with the supplied rules engine 104 to construct an inventory database of metadata expanding the fidelity of the original written document. Further details of this process is shown in FIG. 300. The metadata database is updated in this subprocess and the results are made available to continue the process.

The method may use the metadata database (214) with the rules engine to tag all sentence sources based upon the narrative stream and the explicit definition of all dialog sources: narrator, author, individual speakers, etc. The method may further mark the document (216) in the database for creating environmental visual layers in the final rendered document. Environmental layers will be optionally assigned at the document, chapter, paragraph and sentence level. Sentence environmental and place assignments are identified using both semantic analysis and/or editorial content inputs.

The method may then perform a complete language coherency analysis (218) to determine, by semantic content, the duration timings assigned at the root grapheme and the larger sentence clause structures in the modeled content inputs. The method may then consolidate and build the three dimensional geometries and kinetic property attributes for all view corridors under construction (220). The method may then establish the inventory tagging of the language geometries (222) based upon the four dimensional coordinates for the information gradients of variant and invariant perceptual assignments at the view corridor level. Examples of the levels are described below in more detail. The method may then create the view corridor layers (224) and the discrete geometry and duration properties associated with each proposed channel viewport supported. The method may then create the control mechanisms (226) for each of the corridor viewports and the transportation structures required for the length of the original content and the associated number of view corridors constructed. The method also may then create the licensing and encapsulation (228) for all the associated metadata and export the encapsulated data for later play back. The method may then make the rules engine 104 available to all process steps (230) to access the global data and method rules required for all the processing steps to be successful.

FIG. 300 illustrates a method for lexical/Syntactic/Semantic Analysis that is part of a method for creating the metadata formatted data provided to the system in FIG. 100 for interactive playback. The method in FIG. 300 may be performed by the backend system and its components shown in FIG. 100. The method may access the document (310) and may process any further profiling with the rules engine and any associated editorial tables which have been supplied. The method may then tokenize, using a lexical analysis of the original document, the content of the document (312) to create a full inventory of tokens representing the original language content. A metadatabase on this document is created to mirror the discovered results of the analysis. Using the rules engine 104, a full syntax analysis is performed and each token in the document is classified and the results updated.

The method may then perform a grammatical analysis (314) to identify all sentence clause structures and determine sentence assignments for sentence tagging—simple, compound, complex, compound complex and incomplete. The method also may perform morphological analysis (316) to tag all component parts: words, affixes, parts of speech, intonation/stress and implied context. All tokens are subdivided into their explicit component parts and assigned analytical units: root lexemes, morphemes, affixes, graphemes, phonemes are all tagged.

The method may then perform a frequency analysis (318). The full document is analyzed and word frequency counts are conducted. Word weights and kinetic assignments based upon the overall full coherent document are made in the metadata database at the document level. Included modifications contain outstanding rules engine editorial content assigned by the document profile. In this method, as above, the rules engine is made available to all process steps to access the global data and method rules required for all the processing steps to be successful.

FIG. 500 illustrates a method to construct and package securely the meta-data containers. Internal construction of the metadata is coupled to full rules engine access and procedurally builds attributes for each of the Graphic Model Units (GMUs). A graphic model unit is a three dimensional geometry model built from the original written document word in the and includes any required punctuation. The subset of the GMU is a metadata description of the GMU maintained at the per character level. This character level geometry (Nuclear Geometry) contains the full spatial geometry, kinetic properties and material characteristics designed for presentation in the interactive reading engine.

Thus, as shown in FIG. 500, the GMU metadata is posted internally (502) and the rules engine 104 maintains a flexible metadata container. The nuclear geometry is created (504) using the rules engine 104 in which a child data set is constructed with all of the nuclear geometry for the GMU's organization and attributes. Then the nuclear details (506) are provided which are the linguistic units organized for coherent use. All of the data may then be stored and packaged (508) for the metadata containers.

FIG. 600 illustrates a method of Metadata Encapsulation where metadata containers are built for each graphic model unit (a word in a written document is a subset of a graphic model unit model). These Graphic Model Units (GMUs) (602) are ordinally organized and patterned to include all the required identification fields mandated to identify and tag the data for use in the interactive reading engine. Examples of the GMU metadata (604) is shown in FIG. 600. Each GMU is further subdivided into each constituent character within the GMU and a nuclear geometry assignment (606) is made at the character level. Examples of the nuclear geometry metadata 608 is shown in FIG. 600.

FIG. 700 illustrates a playback process for an interactive display device of a reader that is part of a method for creating the metadata formatted data provided to the system in FIG. 100 for interactive playback. In the process, the system and method's metadata encapsulation is made available for transport to candidate playback devices in the cloud library for an individual reader. In 702, the rules engine is established with all the required software routines and classes including access to global data to evaluate and return required objects to the representative processes. In 704, the actual hardware and software environment of the runtime device is interrogated (and this process is expanded fully in FIG. 700).

In 706, the reader accesses the capability to change the navigation flow of the system and method's language display. From this menu system the reader can manage their place within the written document. Available options include but are not limited to: changing books within their library, chapter selection, free form searching of words, characters, topics, etcetera, level changes (view corridor controls), audio levels and choices, modifying interactive control choices and sensitivities. In 708, the reader has access to their cloud based library and preferences for managing multiple devices, changing written documents, and communicating with social media. In 710, the reader can change their preferences for using the system and method. In 712, the loop event handler waits for triggered events and watches for interactive input from the reader from 714.

In 714, the cascade of possible interactive events profiled as valid for this device runtime instance are monitored. In 716, the prioritization of requests from time, geometric model assessments and runtime kinetic requests are managed with the rules engine for event queuing. In 718, the reader exits the interactive display engine. In 720, the foreground calculations for the language presentation display are managed in concert with the rules engine and the level's view corridor to build the appropriate representative geometry for the foreground scene. In 722, the mid ground calculations for the language presentation display are managed in concert with the rules engine and the level's view corridor to build the appropriate representative geometry for the mid ground scene.

In 724, the background calculations for the language presentation display are managed in concert with the rules engine and the level's view corridor to build the appropriate representative geometry for the background scene. In 726, the merge process composites the three or more layers of calculated geometries using the environmental preferences and the associated light and texture operations into one integrated stereoscopic 360 degree rendered image suitable for the runtime display device. In 728, the real time image is clipped according to the display device capabilities for pushing to the display screen. In 730, the display is updated for the reader's eyes. In 732, the loop is completed by passing control back to FIG. 716.

FIG. 800 illustrates exploded details of Open Meta Data Digital Package that may be used by the system in FIG. 100. The process in FIG. 800 may be performed by the components of the backend system. In 802, the original metadata encapsulation of the written document is retrieved from the cloud library. In 804, the first opening of a reader's interactive display device precipitates an interaction between the software and hardware layers of the device with the runtime interactive engine to fully probe the capabilities of the device. Interacting with the rules engine the probing of capabilities is organized within the rules engine. In 806, the capabilities of the display device are used to filter and structure the written document metadata. The customized metadata encapsulation is updated to the rules engine. In 808, the available user based interactive controls are used to update the possible navigation schemes provided to the reader during device interactions. In 810, the reader's account profile is accessed from the cloud library to use in constructing the runtime engine to meet the reader's preferences.

FIG. 900 is a schematic illustration of playback level change capabilities using the playback engine of the system in FIG. 100. The process shown in FIG. 900 may be performed by the components of the backend system. In 702, rules engine access is provided to deliver the superset of common application classes, procedural requirements, decision making and databases for the interactive display system. In 904, a level change request is received from the playback engine. In 906, the destination for the reader's level request is evaluated. In 908, the seamless alignment of the change in levels is identified and the identical time is identified in the new level. Navigation of the 4 dimensional language digital asset metadata is provided to the established point in time. In 910, the change in level has been executed and appropriate rules engine updates provided before exiting back to process 716 in FIG. 700.

Examples of the User Interface Display of the Deep Reading System and Method

Now, a number of examples of the 4 dimensional display of the deep reading system and method are illustrated and described in more detail. For example, FIGS. 1000-1800 are illustrations embodying certain features of the disclosed process. The first FIG. 1000-1014 depicts a 4 dimensional language sequence in the representative paragraph of the public domain book, "Alice in Wonderland" by Lewis Carroll. In this view corridor the reader has just embarked on a journey of moving by the sentence in three dimensional space. Each word is sitting on an optional thin dimensional strip of platform color coded by the part of speech for this word within the larger sentence structure. Each thin platform in this sequence is dynamically sized by the total dimensional length of the word portrayed. Nouns sit on platforms of gold, verbs sit on platforms of cyan, adverbs sit on platforms of green, adjectives sit on platforms of pink, etc. For example, to facilitate this optional characteristic of the presentation display the reader activates his preference for this part of speech dimensional tagging by toggling his journey experience to include or exclude this option.

As the journey through the list of words continues it becomes apparent the language is molded to a curved surface. The curve is slight but the angle of the curve's radius is controlled in the metadata. Later in the chapter to angle of the curve is controlled to put the reader into the "rabbit hole" perceptually. The lens formula used to render the viewport of the reader is being controlled and managed by the display profile. A flat screen rendering with limited pixel density generates a different display then a high resolution game console's 4K television monitor.

When the reader is running on a comprehensive virtual reality platform journeying through this same sequence of language words the rendered experience is yet again different. The full stereoscopic display engine capability dynamically conforms the reading experience to the larger canvas and viewing angles provided in the virtual reality platform. The existence in virtual reality of a believable third dimension allows the display engine to better manage the information gradients used to separate the foreground, mid ground and back ground planes. The lens formulae for the reader's viewport can be made wide angle in this presentation device and the foreshortening found on flat tablet displays is bypassed by the binocular vision available in true stereoscopic devices.

Continuing the journey through the chapter the frequency and role of Alice as the main story character becomes apparent as the word for "Alice" becomes progressively dimensional: the modeled word for "Alice" is now being imprinted with the third dimensional etching of a young girl's features. This Boolean carving of the bas relief of an "Alice" portrait into the word is also accompanied by enhancing the "Alice" character into more of a ligature value in the perceptual landscape of the journey book. These 3D modeling changes continue in the progressive reading of the book. The word "Alice" becomes much more of a sculptured abstraction. The modeled word is becoming visually recognizable as a word "object"—this ongoing process improves the ease with which the reader comprehends the word. The readers spends less and less time acquiring ("comprehending") the word in the overall reading process while the book journey progresses.

Another attribute of the disclosed journey nature of "reading" is tracking the user's eyes within the device. When the user looks away from the center of the screen to left or right side of the screen the journey quickly slows and stops. When the reader turns their attention back to the center of the screen the journey through the language sequence is "eased in". Travel speed begins to pick up until the reader reaches the same speed they were at before calling for a pause in the reading. If an optional preference has been set, then the starting point in the journey for this reader actually begins a sentence or two before the current paused spot. This method of interaction allows the reader an easy transition to re-enter the stream of the language presentation from a few sentences before the stopped location. Re-reading the language this way provides an improved context for the paused journey.

Optional control can be provided if the reader glances (assume eye tracking available from the device) to the top of the display view screen. This action pauses the journey, the journey is "eased out", and stops. Now the reader is presented with a menu to navigate further with choices to search the document, navigate by chapters, use reader bookmarks, etc. Once in this interactive menu mode the looking up again from the navigation system returns the reader to the journey—transitioning into the selected navigation spot; or possibly returning the reader to the original interrupted journey spot before jumping to the menu selection screen. For user interfaces on a device without eye tracking capability then a mouse, trackball, game controller, touchscreen, keyboard, etc. can be substituted for equivalent capabilities.

When level changes are initiated by the reader during use of the display engine then the reader navigates to a new level and the presentation of the journey continues. The levels are constructed to facilitate the reader finding a comfortable reading 'style' in the reading engine. For example, an avid reader can find a streamlined personalized level which gives them the best language presentation of the written document for the fastest reading. Another level might present by the font chosen and the designed colors a reading presentation styled for a young reader. Another designed level might be implemented for an older reader where camera positions are placed in the reading machine to allow for the easiest manipulation of viewing angles and scale settings for the size and kinetic properties of the reader's eye limitations.

In a new level the presentation abstraction of the language can be increased. Visually what the reader is seeing in the reading engine display depends on a matrix of the reader's preferences intersecting with the new selected level. For example the words could be modeled in the display engine as vertically organized. A word such as the "Queen" can be written as "Qu" where the letters "een" appear vertically under the "u". The orientation of the language is quickly learned by the reader and how these words are constructed of two interlocking parts. A horizontal "Q" and a vertical component of "ueen" is now the connected model. The display engine can now manage the rotation of the letters coming on screen more effectively and improve the perceptual range of kinetic possibilities. The "Qu" is at first presented in the distance as a rotated word object. As the word becomes closer to the active viewing area of the reader's eyes then the word begins to rotate to present the full set of letters to the reader. As this word dynamic is being managed by the device earlier words are beginning to dissolve and remove themselves from the active view corridor. New words in the sentence are coming on screen as older processed words are gracefully exiting the reader's visual corridor. Much like a falling set of dominoes the presentation of words can be made eye friendly and the entire experience can be controlled dynamically at runtime. Each word is used as a proximity trigger to sponsor the movement of the next word in the sequence.

This vertical construction of words in this example allows the device to better manage the display footprint and the choreography of the eye's saccadic moments thus improving the efficiency of the reading process. This controlled journey experience improves the perceptual enjoyment of the reading experience and removes much of the labor associated with traditional page oriented, place based reading. These changes in the density of words on the engine's display screen improve the available range of positional attributes in language presentation. These methods drive a larger set of degrees of freedom to build other levels of language presentation when the words constituting sentences are oriented vertically.

In another level the foreground, midground and background view corridors are separately maintained. For example, when dealing with this "Alice in Wonderland" book paragraphs involving the "Queen of Hearts" would be constructed dynamically at runtime. The displayed background layer might be repetitively built color card soldiers standing at a distance while the language presentation is all handled in the foreground. The midground might be visually managed to reflect the identity of the speaker in various dialog scenes, making the speaker of the words more emphatic. By placing the dialog of the main character spatially closer to the reader and by making other dialog in the written document by minor characters appear spatially further away from the reader there is a new attribute available in reading. The reading engine uses this new attribute to make dialog easier to read and understand intuitively. The pacing of the language presented in the sentences in the foreground can also reflect the "activity" level being presented in the foreground. Alice running from her chasers might speed up the pacing of the language foreground presentation. These types of visual and kinetic considerations are handled in the metadata attributes processed at runtime to improve the immersive and perceptual engagement of the reader.

Understanding grammatical structure of a document is enhanced in the metadata capacity to allow for spatial paths to be constructed for the reader. The reading journey can use spatial assignments to organize sentences so that as a sentence is ending it gracefully moves back in space along a curve. Conversely when a sentence is starting the geometry of the words presented on screen are curved to a path that mimics a Bezier curve shaping the constituent characters in the words and making for an easily understand start and end of sentence by metadata attribute tagging. Start and end of paragraphs can be similarly modified spatially supplying the reader with a richer set of visual cues to understand the context and content they are reading.

The level design of the system is 1 to N and therefore the availability of choice for the reader to find their own best reading style is large. Moving from level to level is seamless and the reader interactively choosing a next or previous level maintains the written document's location in reading location. The change in level initiated by the reader happens immediately. Within each level the reader can change the camera view (orientation of the camera to the scene or the field of view of the camera) and through interactive controls (mouse, gesture control, touch screen, voice or eye tracking) control the zooming in and or out of the displayed scene. The speed of the language presented can be paused, reversed, forwarded or interactively jumped to a next or previous chapter. These action events interactively available to the reader are also field controlled in the metadata and optional levels can be programmed to automatically include parameters. Levels are chosen dynamically, camera choices are automatically made, field of view changes initiated, all metadata choices managing a best in class reading journey experience.

FIGS. 1002-1014 are a time ordered filmstrip depiction of 4 dimensional language display for Level 1 that may be part of the deep reading method provided by the system in FIG. 1000. The time order filmstrip depiction in FIGS. 1000-1014 shows the 4 dimensional language display for LEVEL 1 of the deep reading system and thus provides an example of the handing of the first Level playback of a written document in which LEVEL 1 may be a simplest level of the reader display where language remains four dimensional but the language kinetic properties are minimized. Each letter is placed by virtue of its metadata specification on a curved surface. The reader is provided interactive control of the reading speed, camera viewport, camera field of view and level design.

FIGS. 1100-1114 illustrate an example of the LEVEL "X" embodiment of time ordered filmstrip depicting the use of interactive motion controls to change the reader's viewport. The reader proactively changes to an implemented camera in FIG. 1108-1112. The reader's camera choice changes the view and the dimensional perspective provided the reader. FIG. 1114 illustrates another camera viewport change with the resulting lens formula choice displaying the language in a new dimensional space. These camera choices adhere to the natural perceptual framework of the human mind eye continuum and thus the information gradient provided is well understood. Multiple cameras are provided for viewing a document's LEVEL "X" and any number of camera choices can be used in the reading experience.

FIGS. 1200-1214 illustrate an example of a LEVEL "X" embodiment of time ordered filmstrip depicting spatial attributes used to add dynamic attributes to dialog provided in the metadata of a written document. For example in FIGS. 1202-1208 Alice's first dialog in the book "Alice in Wonderland" is being read by the user. The metadata has tagged the language with a main character designation ("Alice") and at runtime using the LEVEL as a variable for the best implementation method. The method provides the spatial attributes for the X,Y, and Z axis and the text in Alice's dialog fragment is moved in space. In FIG. 1210 the first dialog fragment finishes and the narrator's language (thought Alice) returns to the narrator's separate and independent spatial assignment. In FIG. 1214 the next Alice dialog fragment returns spatially to its X,Y, Z position for the main character. Conversely when another character has dialog in the written document there is a separate spatial dimension assigned to these other characters and the net result for the reader is that the spatial assignments intuitively give the reader new and better information about the language presented. The reading experience is enhanced because the reader's eyes natively in the method's 4 dimensional framework understand when the language is being said by the main character Alice, language is by the narrator, and language is being provided in the document by characters other than the main character. Spatially separating the language by the source of the dialog (for example: main character, other character, narrator) makes reading dialog easier to understand. There is of course no reason to restrict dialog separation to just three information gradients. Other embodiments could extend the metadata to uniquely tagging dialog spatially and with kinetic properties to all characters with a written document extending the reach of the embodiment.

FIGS. 1300-1314 illustrate an example of the LEVEL "X" embodiment of time ordered filmstrip depicting interactive control given the reader to navigate the displays zoom characteristics for viewing a written document in the method's viewport. In these figures, each frame is an ordinal time ordered sequence and the eight examples are in serial time order with each frame representing a fraction of a second. The reader in this example is interactively choosing to move their eye position back in space. The angle of view provided changes the information density on the display and the reader can now "see" more of the written document on screen.

FIGS. 1400-1414 illustrate an example of a LEVEL "X" embodiment of time ordered filmstrip depicting runtime modification in language modeling technology and the resulting change in kinetic properties assigned at runtime. In these figures, each frame is an ordinal time ordered sequence and the eight examples are in serial time order with each frame representing a fraction of a second. The word "conversation" in the FIGURE is being simultaneously rotated on screen to a final resting place to be read while also being scaled from nothing to a final size on screen. The reading method provides for the designation of kinetic properties to both enter the reader's viewport and to exit the reader's viewport. Managing the entry and exit events for language both spatially and temporarily at the individual GMU level provides a method to pace the reading speed of the written document. Our mind's naturally focus perceptually on new events entering our eye's viewport. Controlling these presentation events and how GMU's ("words") are introduced is managed by the reading engine and the associated level's metadata.

FIGS. 1500-1502 illustrate an example of the direct relationship maintained in the metadata between the geometry details and the language shown in the method's viewport. In FIG. 1500 a single filmstrip frame is displayed by the method. In FIG. 1502 is an example snapshot of the nuclear geometry metadata linked to the viewport displayed for the reader. The nuclear geometry details construct the visual presentation of the language contained in the reading engine. The nuclear geometry is sourced from the original document produced in FIG. 100 however, the reading engine further enhances the data when sensor inputs are available within a device. These enhancements to the nuclear geometry produce runtime displays from the reading engine that fit the placement of the reading engine displays in the best appropriate place in a virtual or augmented reality environment.

FIGS. 1600-1604 illustrate an example of the LEVEL "X" embodiment of time ordered filmstrip depicting the use of atmospheric displays within the method to enhance the understanding, setting and maintenance of the reader's mood. Passages within the document are tagged in the metadata to orchestrate changes in the run time presentation to alternative LEVEL "X" locations. Metadata also sets the camera viewport, lens formulas and layering of environmental assets contributing to the reader's experience and the setting of visuals supporting the passages. One example of this atmospheric layering is applying a mural painting to the background sky and ground plane used in the reading engine. These animated sky ground environments can be illustrations (such as Alice with her cards in this FIG. 1600-1604), procedurally calculated color gradients coordinated with the material colors applied to the fonts, or other kinetic visual events. For example in a book such as "Call of the Wild" by Jack London the outdoor snow scene written passages in the book could consistently create a viewport display of an artificial snow storm. The intensity of the snowstorm and the kinetic properties of the snow storm produced in the reading engine are used to parallel the thoughts produced by London's book language while enhancing the visual appeal of the reading experience. Three dimensional models can also be placed in the time ordered LEVEL "X" landscape scenes to further enhance the method.

FIGS. 1700-1714 illustrate an example of the LEVEL "X" design and use of specialized ligatures constructed and used within the metadata. Many part of speech coordinating conjunctives ("and", "or", "but", "or", etc.), subjective conjunctives ("of", "by", "into", "as", "for") and determiners ("the", "a", "an", "this", "all", etc.) are converted into formally designed specialized ligatures. Any written document contains a large percentage of these designated parts of speech and by developing the use of specialized ligatures in selected LEVEL "X" implementations the density of the information is improved. The scale and kinetic properties used for presenting these geometries creates a more efficient and easier to read document. In FIG. 1712 is a document fragment "And the rabbit said to the duck . . . ". In FIG. 1714 the fragment is presented with specialized ligature designs being substituted where appropriate. By classifying these parts of speech with special geometric characteristics the reader understands the content while being able to prioritize their reading of more important words.

FIGS. 1800-1812 illustrate the embodiment of using spatial attributes in the method to present language syntax. FIG. 1808 contains a Chapter One Alice in Wonderland fragment "White Rabbit with pink eyes ran close by her. There was nothing". In FIG. 1810 the illustrations show the addition of two (A) and (B) spatial paths. These three dimensional paths are the foundation for re-arranging spatially the letters through the method's applied nuclear geometry metadata. The end of the sentence fragment "with pink eyes ran close by her." follows the path in three dimensional space gracefully pulling the eye's attention. In the fragment of the starting sentence, "There was nothing" the letters in the fragment begin spatially separated from the end of the previous sentence and gracefully curve to a standard LEVEL "X" spatial treatment for narration. FIGS. 1800-1806 illustrate the embodiment of time ordered filmstrip depicting the reader's eyes traveling through the sequence of the presented fragments. In FIG. 1802 the "pink eyes ran close by her." curve back in space. In FIG. 1804 the start of the sentence "There was nothing" is coming into the frame and is spatially separated from the end of the previous sentence. FIG. 1812 summarizes the spatial treatment used in the method to apply spatial attributes for this simple example of ending sentences and beginning sentences. Paragraph starts and paragraph endings and other syntactical arrangements are similarly treated to use spatial attributes for adding easily seen and useful cues for reading.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method disclosed herein may be implemented via one or more components, systems, servers, appliances, other subcomponents, or distributed between such elements. When implemented as a system, such systems may include an/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method herein may be achieved via implementations with disparate or entirely different software, hardware and/or firmware components, beyond that set forth above. With regard to such other components (e.g., software, processing components, etc.) and/or computer-readable media associated with or embodying the present inventions, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, handheld or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method may be achieved via or performed by logic and/or logic instructions including program modules, executed in association with such components or circuitry, for example. In general, program modules may include routines, programs, objects, components, data structures, etc. that perform particular tasks or implement particular instructions herein. The inventions may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the disclosure may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the invention or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the invention, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the invention have been specifically described herein, it will be apparent to those skilled in the art to which the invention pertains that variations and modifications of the various implementations shown and described herein may be made without departing from the spirit and scope of the invention. Accordingly, it is intended that the invention be limited only to the extent required by the applicable rules of law.

While the foregoing has been with reference to a particular embodiment of the disclosure, it will be appreciated by those skilled in the art that changes in this embodiment may be made without departing from the principles and spirit of the disclosure, the scope of which is defined by the appended claims.

The invention claimed is:

1. A computer-implemented method for transforming original written documents into a total reading medium, the method comprising:
   receiving an original written document by the computer, the original written document having a plurality of words;
   computationally redefining the received document into associated metadata taking into consideration the semantic, syntactical, lexical, and grammatical structures of the original document to create a perceptual framework suitable for presentation in a full three dimensional architecture;
   generating a visual effect for each word in the plurality of words in the original written document based on the associated metadata for each word;
   calculating a plurality of levels in three dimensional space for interacting with the words of the original written document, wherein each level controls a rate of language flow and a degree of complexity and contains the visual effect for each word; and
   dynamically generating, in response to a user command while the user is interacting with a visual reading medium for the original written document, the visual reading medium by selecting and displaying one of the calculated levels, wherein each level of the visual reading medium includes each of the plurality of words of the original written document in the three dimensional space with the visual effect.

2. The method of claim 1, wherein redefining the received document further comprises generating a plurality of layers of the original language content within the metadata by spatially organizing events in one of color, size, kinetic attributes and time durations to provide new language attributes.

3. The method of claim 1 further comprising interactively navigating the reading medium.

4. The method of claim 3, wherein interactively navigating the reading medium further comprises using an interactive control to navigate the reading medium.

5. The method of claim 4, wherein the interactive control further comprises one of a touch, a gesture, a game controller, a mouse, a voice command, an eye movement, and external data input through sensor data collection.

6. The method of claim 4, wherein interactively navigating the reading medium further comprises one of speeding up the flow of words and slowing down the flow of words in the presentation.

7. The method of claim 1, wherein computationally redefining the received document further comprises applying a geometry characteristic to a lexeme in the received document.

8. The method of claim 7, wherein applying the geometric characteristic further comprising separating dialog in the received document from narration using the geometric pattern.

9. The method of claim 7, wherein applying the geometric characteristic further comprising separating a dialog of a character from the dialog of a second character in the received document.

10. The method of claim 9, wherein separating the dialogs further comprises applying one of color, texture and kinetic properties to distinguish the dialogs.

11. The method of claim 7, wherein applying the geometric characteristic further comprises applying the geometric characteristic to identity a beginning of a sentence and an end of the sentence in the received document.

12. The method of claim 11, wherein identifying the beginning and end of the sentence further comprises applying one or more of a spatial attribute and a rate of travel attribute to identify the beginning and end of the sentence in the received document.

13. The method of claim 1, wherein the metadata further comprises one of an atmospheric attribute and a mood setting attribute.

14. The method of claim 13 further comprising providing atmospheric controls based on the atmospheric attribute.

15. The method of claim 1 further comprising inserting a bookmark to save a location in the received document.

16. The method of claim 15 further comprising selecting the inserted bookmark to return to the location in the received document and return a setting of a reading engine to the setting when the bookmark was inserted.

17. The method of claim 1 further comprising receiving sensory data to modify the presentation.

18. The method of claim 1 further comprising receiving three dimensional spatial data to modify the presentation.

19. The method of claim 1, wherein computationally redefining the received document further comprises generating a plurality of levels of the metadata.

20. The method of claim 1 further comprising navigating between the plurality of layers.

21. The method of claim 1, wherein the plurality of words includes a plurality of determiners, a plurality of coordinating conjunctives and a plurality of subjective conjunctives and wherein generating the visual effect further comprises assigning specialized ligatures to the plurality of determiners, the plurality of coordinating conjunctives and the plurality of subjective conjunctives that are different from other words in the plurality of words and displaying the specialized ligatures in the visual reading medium.

22. An apparatus comprising:
a computer system having a processor and a memory;
the processor configured to receive an original written document, the original written document having a plurality of words;
the processor configured to computationally redefine the received document into associated metadata taking into consideration the semantic, syntactical, lexical, and grammatical structures of the original document to create a perceptual framework suitable for presentation in a full three dimensional architecture;
the processor configured to modify each word of the plurality of words in the original written document based on the associated metadata to generate a visual effect of each word in the plurality of words;
the processor configured to calculate a plurality of levels in three dimensional space for interacting with the words of the original written document, wherein each level controls a rate of language flow and a degree of complexity and contains the visual effect for each word; and
the processor configured to dynamically generate, in response to a user command while the user is interacting with a visual reading medium for the original written document, the visual reading medium by selecting and displaying one of the calculated levels, wherein each level of the visual reading medium includes each of the plurality of words of the original written document in the three dimensional space with the visual effect.

23. The apparatus of claim 22, wherein the processor is configured to generate a plurality of layers of the original language content within the metadata by spatially organizing events in one of color, size, kinetic attributes and time durations to provide new language attributes.

24. The apparatus of claim 22 further comprising an interactive control connected to the computer system to navigate the reading medium.

25. The apparatus of claim 24, wherein the interactive control further comprises one of a touch, a gesture, a game controller, a mouse, a voice command, an eye movement, and external data input through sensor data collection.

26. The apparatus of claim 22, wherein the processor is configured to apply a geometry characteristic to a lexeme in the received document.

27. The apparatus of claim 26, wherein the processor is configured to separate dialog in the received document from narration using the geometric pattern.

28. The apparatus of claim 26, wherein the processor is configured to separate a dialog of a character from the dialog of a second character in the received document.

29. The apparatus of claim 28, wherein the processor is configured to apply one of color, texture and kinetic properties to distinguish the dialogs.

30. The apparatus of claim 26, wherein the processor is configured to apply the geometric characteristic to identity a beginning of a sentence and an end of the sentence in the received document.

31. The apparatus of claim 30, wherein the processor is configured to apply one or more of a spatial attribute and a rate of travel attribute to identify the beginning and end of the sentence in the received document.

32. The apparatus of claim 22, wherein the metadata further comprises one of an atmospheric attribute and a mood setting attribute.

33. The apparatus of claim 32 further comprising atmospheric controls based on the atmospheric attribute.

34. The apparatus of claim 22, wherein the processor is configured to insert a bookmark to save a location in the received document.

35. The apparatus of claim 34, wherein the processor is configured to select the inserted bookmark to return to the location in the received document and return a setting of a reading engine to the setting when the bookmark was inserted.

36. The apparatus of claim 22, wherein the processor is configured to receive sensory data to modify the presentation.

37. The apparatus of claim 22, wherein the processor is configured to receive three dimensional spatial data to modify the presentation.

38. The apparatus of claim 22, wherein the processor is configured to generate a plurality of levels of the metadata.

39. The apparatus of claim 22, wherein the processor is configured to navigate between the plurality of layers.

40. The apparatus of claim 22, wherein the plurality of words includes a plurality of determiners, a plurality of coordinating conjunctives and a plurality of subjective conjunctives and the processor is further configured to assign specialized ligatures to the plurality of determiners, the plurality of coordinating conjunctives and the plurality of subjective conjunctives that are different from other words in the plurality of words and display the specialized ligatures in the visual reading medium.

* * * * *